(12) United States Patent (10) Patent No.: US 8,335,122 B2
Dreslinski, Jr. et al. (45) Date of Patent: Dec. 18, 2012

(54) CACHE MEMORY SYSTEM FOR A DATA PROCESSING APPARATUS

(75) Inventors: Ronald George Dreslinski, Jr., Sterling Heights, MI (US); Gregory Kengho Chen, Ann Arbor, MI (US); Trevor Nigel Mudge, Ann Arbor, MI (US); David Theodore Blaauw, Ann Arbor, MI (US); Dennis Sylvester, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1038 days.

(21) Appl. No.: 12/292,148

(22) Filed: Nov. 12, 2008

(65) Prior Publication Data

US 2009/0138658 A1 May 28, 2009

Related U.S. Application Data

(60) Provisional application No. 60/989,724, filed on Nov. 21, 2007.

(51) Int. Cl.
*G11C 5/14* (2006.01)
(52) U.S. Cl. .................. 365/226; 365/49.1; 711/130
(58) Field of Classification Search .............. 365/226, 365/49, 49.1; 711/130
See application file for complete search history.

(56) References Cited

U.S. PATENT DOCUMENTS

| | | | | |
|---|---|---|---|---|
| 5,931,951 | A * | 8/1999 | Ando | 713/324 |
| 7,424,663 | B2 * | 9/2008 | Mehalel | 714/763 |
| 2002/0184446 | A1 * | 12/2002 | Kagan et al. | 711/130 |

OTHER PUBLICATIONS

Albonesi, David H. et al., "Selective Cache Ways: On-Demand Cache Resource Allocation", (1999), 12 pages.
Binkert, Nathan L. et al., "The M5 Simulator: Modeling Networked Systems", IEEE Micro, 26(4), (Jul./Aug. 2006), 17 pages.
Calhoun, Benton H. et al., "Characterizing and Modeling Minimum Energy Operation for Subthreshold Circuits", 3.1, IEEE/ACM ISLPED, (2004), pp. 90-95.
Calhoun, Benton H. et al., "A 256kb Sub-threshold SRAM in 65 nm CMOS", IEEE ISSCC / Session 34 / SRAM / 34.4, (2006), pp. 628-629 & 678.
Chen, Gregory K. et al., "Yield-Driven Near-Threshold SRAM Design", In Proc. Int'l. Conf. on Computer Aided Design, (2007), 7 pages.
Dreslinski, Ronald G. et al., "An Energy Efficient Parallel Architecture Using Near Threshold Operation", In Proc. 16th Ann. Int'l Conf. on Parallel Architectures and Compilation Techniques, (2007), 11 pages.
Gathaus, Matthew R. et al., MiBench: A Free, Commercially Representative Embedded Benchmark Suite, In Proc, Int'l. Symp. on Low-Power Electronics and Design, (2005), 12 pages.
Henning, John L., "Spec CPU 2000: Measuring CPU Performance in the New Millennium", IEEE Computer, 33(7), (Jul. 2000), pp. 28-35.

(Continued)

*Primary Examiner* — Huan Hoang
(74) *Attorney, Agent, or Firm* — Nixon & Vanderhye P.C.

(57) ABSTRACT

A data processing apparatus is provided having a cache memory comprising a data storage array and a tag array and a cache controller coupled to the cache memory responsive to a cache access request from processing circuitry to perform cache look ups. The cache memory is arranged such that it has a first memory cell group configured to operate in a first voltage domain and a second memory cell group configured to operate in a second voltage domain that is different from the first voltage domain. A corresponding data processing method is also provided.

41 Claims, 15 Drawing Sheets

OTHER PUBLICATIONS

Inoue, Koji et al., "Way-Predicting Set-Associative Cache for High Performance and Low Energy Consumption", In Proc. Int'l. Symp. on Low-Power Electronics and Design, (1999), 3 pages.

Kim, Nam Sung et al., "Single-VDD and Single-VT Super-Drowsy Techniques for Low-Leakage High Performance Instruction Caches", In IEEE/ACM ISLPED, (2004), pp. 54-57.

Kim, Tae-Hyoung et al., "A High-Density Sub-Threshold SRAM with Data-Independent Bitline Leakage and Virtual Ground Replica Scheme", In IEEE ISSCC 2007 / Session 18 / SRAM / 18.5, (2007), pp. 330-331 and 606.

Kin, Johnson et al, "The Filter Cache: An Energy Efficient Memory Structure", IEEE, (1997), pp. 184-193.

Powell, Michael D. et al., "Reducing Set-Associative Cache Energy via Way-Prediction and Selective Direct-Mapping", In Proc. of 34th Annual Int'l. Symp. on Microarchitecture (MICRO), (2001), 12 pages.

Tang, Weiyu et al., "Design of a Predictive Filter Cache for Energy Savings in High Performance Processor Architectures", In Int'l. Conf. on Computer Design, (2001), 16 pages.

Verma, Naveen et al., "A 65NM 8T Sub-Vt, SRAM Employing Sense-Amplifier Redundancy", In IEEE ISSCC / Session 18 / SRAM / 18.4, (2007), pp. 328-329 and 606.

Wang, Alice et al., "A 180mv Subthreshold FFT Processor Using a Minimum Energy Design Methodology", Journal of Solid-State Circuits, vol. 40, No. 1, (Jan. 2005), 310-319.

Zhai, Bo et al., Theoretical and Practical Limits of Dynamic Voltage Scaling, In DAC, (2004), pp. 1-7.

Zhai, Bo et al., A Sub-200mV 6T SRAM in 0.13um CMOS, In IEEE ISSCC 2007 / Session 18 / SRAM / 18.6, (2007), pp. 332-333 and 606.

Zhai, Bo et al., "Energy Efficient Near-Threshold Chip Multi-Processing", In Proc. Int'l. Symp. on Low-Power Electronics and Design, (2007), 6 pages.

Zhai, Bo et al., "Analysis and Mitigation of Variability in Subthreshold Design", In. Proc. Int'l. Symp. on Low-Power Electronics and Design, (2005), 6 pages.

Zhai Bo et al., A 2.60pJ/Inst. Sub-Threshold Sensor Processor for Optimal Energy Efficiency, IEEE VLSI Technology and Circuits, (2006), 2 pages.

Zhang, Chuanjun et al., "A Highly Configurable Cache Architecture for Embedded Systems", In Proc. 30th Ann. Int'l. Symp on Computer Architecture, (2003), 11 pages.

* cited by examiner

CACHE MEMORY SYSTEM FOR A DATA PROCESSING APPARATUS

This application claims the benefit of U.S. Provisional Application No. 60/989,724, filed 21 Nov. 2007, the entire contents of which is hereby incorporated by reference.

BACKGROUND OF THE INVENTION

1. Field of the Invention

The present invention relates to a cache memory system for a data processing apparatus.

As technology advances, there is an increasing requirement for embedded processors having high processing capabilities to perform complex tasks, yet which offer a battery lifetime that is sufficiently long that it is acceptable to a user. This is particularly true of mobile processing devices such as mobile telephones, personal digital assistants, laptop computers and so on. Such mobile devices are demanding more and more processing power, but battery lifetime still remains an important concern. Thus there is a clear requirement for energy-efficient embedded processors capable of performing the computationally intensive demands of modern program applications.

2. Description of the Prior Art

It is known to provide energy efficient processors by scaling the supply voltage of the processing logic in accordance with the energy requirements of the current or recent processing workload. For example, the processing logic can be configured to operate at a plurality of different operating voltages such that both low-power efficient processing and higher-power, higher-performance processing can be performed as required. In such systems processing logic tends to have different supply voltages corresponding respectively to different target processing frequencies. Processing logic is relatively robust under supply voltage scaling and needs little adaptation in order to reliably maintain yield and function at lower operating voltages than the standard operating voltage for the logic concerned. By way of contrast memory cells are not very robust under supply voltage scaling. Thus resizing or reconfiguration of the memory cells is typically required to maintain reliable operation at low supply voltages.

It is known to provide a cache memory system in which a filter cache is employed to provide a small, low energy per access cache in between the processor and the Level 1 (L1) cache. This additional small cache then filters access to the larger, more energy-hungry, L1 cache. In these known systems the filter cache and the L1 cache have identical memory cell sizes and operating voltages and the performance benefit of the filter cache is attainable due to the smaller overall memory size (i.e. fewer memory cells) of the filter cache, which is more efficient to access provided that the hit rate of memory accesses in the filter cache is sufficiently high. However, there is a disadvantage of using a filter cache because if the memory access pattern creates a high miss rate in the filter cache then the system energy consumed can actually increase overall as a result of the requirement to access both the filter cache and the L1 cache. The processing performance can also be degraded because those cache accesses that miss in the filter cache but hit in the L1 cache necessarily take two cycles to access the required data instead of the one cycle that as it would take in a system having only an L1 cache.

It is also known to provide a cache memory system in which a way prediction mechanism" is employed. Such way prediction mechanisms use algorithms to predict the likelihood of data corresponding to a particular required cache access being located in a particular portion of the cache and reduce energy consumption by only checking the one of the plurality of cache ways in which it is predicted that the required data is stored. In these known way prediction mechanisms, if the success rate of the way prediction falls below an acceptable level then the prediction algorithm is fine tuned in order to improve the quality of the prediction. However, the location of the data in the cache is not changed in order to improve the prediction outcome.

Thus there is a requirement to reduce the energy consumption of on-chip cache structures that does not unduly compromise the capability of the processing device to operate in a high performance mode yet enables the battery lifetime to be preserved by offering a capability of processing with a comparatively low-power consumption as and when required. Furthermore, there is a requirement to enable memory cells of a cache memory structure to operate at lower power without compromising the reliability of the memory cells.

SUMMARY OF THE INVENTION

According to a first aspect the present invention provides apparatus for processing data comprising:

a cache memory comprising a plurality of memory cells forming a storage array having a plurality of cache lines and a tag array providing an index of memory locations associated with data elements currently stored in said storage array;

a cache controller coupled to said cache memory and responsive to a cache access request from processing circuitry to perform a cache lookup with reference to said cache tag array;

wherein said plurality of memory cells comprises a first memory cell group configured to operate in a first voltage domain and a second memory cell group configured to operate in a second voltage domain different from said first voltage domain.

The present invention recognises that the energy consumption of a cache memory system can potentially be reduced by providing a cache memory structure that comprises a first memory cell group configured to operate in a first voltage domain and a second memory cell group configured to operate in a second voltage domain that is different from the first voltage domain. The capability of having two different voltage domains for the memory cells in a single cache memory provides the flexibility to enable both low power processing and high performance processing as required without compromising the reliability of the cache memory. This is achievable since the characteristics (e.g. cell size or configuration) of the memory cells of the first memory cell group and the second memory cell group can be tuned for a desired reliability level according to one or more characteristic operating voltages (voltage domain dependent) associated with the respective memory cell group.

In this specification a given "voltage domain" is considered to comprise a memory region (circuit area) or group of memory regions (circuit areas) having its own power supply circuitry that is separate from the power supply circuitry of another different voltage domain. A given voltage domain has one or more characteristic supply (or operating) voltages or characteristic voltage ranges.

For example, in some embodiments a given voltage domain has a first characteristic supply (or operating) voltage corresponding to a low power state of operation and a second (higher) characteristic supply voltage corresponding to a high power state of operation. In some embodiments, the supply voltages characteristic of the first voltage domain are different from the characteristic voltage(s) of the second voltage domain. However, in alternative embodiments, the first voltage domain and the second (different) voltage domain have substantially that same characteristic supply voltage at a given point in time.

It will be appreciated that the characteristics of the memory cells of the first memory cell group and the second memory cell group could be adapted in a number of different ways such that the two memory cell groups have different physical properties appropriate to the particular values of the first operating voltage and the second operating voltage. However, in one embodiment, the second operating voltage is higher than the first operating voltage and at least a portion of the first memory cell group have a memory cell size that is larger than a memory cell size corresponding to the second memory cell group. Thus the memory cell size of the first memory cell group can be tuned to provide a failure rate that is consistent with the failure rate of the second memory cell group, which operates at a higher operating voltage. This improves the likelihood of reliable operation of the cache memory when tuned either for low-power consumption (power-saving performance level) or higher power consumption (standard performance level). Thus, for example, memory cells of the first memory cell group can be appropriately increased in size relative to memory cells of the second memory cell group so as to reduce any potential reliability problems associated with having a first operating voltage that is lower than the second operating voltage. Care can also be taken not to oversize cells of the first memory cell group since over-sizing could cause a reduction of performance of the data processing apparatus when not operating in a power-saving mode.

Although in some embodiments different memory cell sizes can be used in the first memory cell group relative to the second memory cell group in order to comply with reliability requirements, in an alternative embodiment the reliability requirements can be complied with instead by providing an apparatus in which at least a portion of the first memory cell group has a different cell configuration than a memory cell configuration corresponding to the second memory cell group. Thus, for example, the first memory cell group could have a six transistor configuration whereas the second memory cell group could have a eight transistor configuration in order to balance the difference in respective operating voltages. Use of different memory cell configurations rather than different memory cell sizes offers the possibility to avoid undue increases the die space of the embedded processor (due to increasing the cell size of the memory cells in order to accommodate lower operating voltages).

It will be appreciated that the cache system could be implemented in any type of cache memory. However, in one embodiment, the cache is an N-array set-associative cache having N storage arrays and N tag arrays corresponding respectively to the N-cache arrays. This type of cache design is easy to implement and can be readily adapted to have a first memory cell group operating in a first voltage domain that is different from a second voltage domain associated with a second memory cell group. In one such embodiment, a first subset of the N storage arrays comprises said first memory cell group and a remaining subset of the N storage arrays comprises the second memory cell group. This provides an implementation that is straight-forward to fabricate and engineer since the two different categories of memory cell i.e. the first memory cell group and the second memory cell group are simply mapped to different subsets of the N storage arrays.

The cache system could be controlled to operate in a low power mode (power-saving performance level) or a standard performance mode (standard performance level) in any one of the number of different ways. However, in one embodiment the cache memory is responsive to a performance control signal indicative of a desired cache performance level to operate in the plurality of different cache modes. This provides a convenient mechanism for switching between a power saving mode and a performance-critical (or standard) mode that facilities programmable control of the switching between the different modes and enables straightforward reconfiguration of the data processing apparatus to adapt to a current processing workload.

In one such embodiment, the desired cache performance level is one of a standard performance level corresponding to a standard cache mode and a power-saving performance level corresponding to a power-saving cache mode in which less power is consumed relative to said standard cache mode. Accordingly, time-critical calculations can be performed in the standard cache mode whereas non time-critical or less complex or computationally intensive tasks can be performed in the power-saving mode in order to prolong the battery lifetime. It will be appreciated that the terms standard performance level and power-saving performance level are relative to each other and, for example, the standard performance level could equally considered to be a high performance level relative to the lower power-saving performance level.

It will be appreciated that the programmer could manually configure when the cache system should be operated in the power-saving cache mode or in the standard cache mode. However, according to one embodiment, the cache controller is arranged to dynamically control the cache memory to operate in either the power-saving cache mode or the standard cache mode. This reduces the burden on the programmer to determine which processing mode is the most efficient for a given set of processing conditions (which vary with time) and thus offers improved efficiency by more accurate determination of the most appropriate mode of operation.

It will be appreciated, that there is no requirement for the tag arrays corresponding to the first subset of N storage arrays to be of a type matching the type of the associated memory cells. Similarly, there is no need for the memory cells of the tag array corresponding to the remaining subset of N storage arrays to be of a type corresponding (matching) to the remaining subset of memory cells. However, in one embodiment the tag arrays corresponding to the first subset of N storage arrays comprise cells of the first memory cell group and tag arrays corresponding to the remaining subset of the N storage arrays comprise cells of the second memory cell group. This provides a convenient structural organisation of the cache where the corresponding tag arrays have a memory cell type that matches the respective storage arrays. This facilities contemporaneous access to each of the first subset/remaining subset storage array and the corresponding respective tag array using a single respective supply voltage line (of either the first voltage or the second voltage). Thus the look-up of requested data in the tag array and activation the data for output from the corresponding data array can be effectively coordinated.

In an alternative embodiment, the tag arrays corresponding to both the first subset of N storage arrays and the remaining subset of N storage arrays all comprise cells of the first memory cell group. Thus all of the tag arrays have the same required operating voltage. This facilities substantially simultaneous access to all tag arrays upon an initial look up of a required memory location. This provides additional information to the processing device so that, if there is a cache miss in the first subset of N storage arrays, the data processing system can readily establish whether or not the required data is accessible in the remaining subset of N storage arrays before even having activated the remaining subset of N storage arrays.

Some embodiments have both a standard cache mode and a power-saving cache mode, the cache is an N-array set associative cache having N storage arrays and N tag arrays corresponding respectively to the N cache ways and a first subset of the N storage arrays comprises the first memory cell group and a remaining subset of the N storage arrays comprises the second memory cell group and a first operating voltage corresponding to the first voltage domain is lower than a second operating voltage corresponding to the second voltage domain. In some such embodiments, in the standard cache mode (but not the power-saving cache mode) all of the N tag arrays and data from each of the corresponding N data arrays is accessed in parallel in a single processing cycle. This ameliorates the effects of the provision of the two different memory cell groups operating in respective different voltage domains (and in these embodiments at respectively different operating voltages), since in the standard performance mode all of the cache is utilised. This avoids performance degradation that can be associated with systems such as filter caches, which arises due to the increased runtime associated with separately accessing the filter cache and the L1 cache when the hit rate in the filter cache is low. Thus, although there could be performance impact due to the requirement to adapt (e.g. increase size of) the memory cells associated with the lower of the two operating voltages the memory cell group having the lower operating voltage is not simply bypassed in the standard cache mode but is instead fully utilised.

In one such embodiment, in the power-saving cache mode the first subset of N storage arrays is accessed in a given processing cycle and, only in the event of a cache miss, is the remaining subset of N storage arrays accessed in a processing cycle subsequent to the given processing cycle. This increases the efficiency of the cache system by avoiding having to power up all of the storage arrays upon every cache access. Furthermore, the higher the hit rate in the first subset of N storage arrays then the more energy is saved by not accessing the remaining subset of N storage arrays in the same processing cycle.

In one such embodiment where only the first subset of N storage arrays is accessed in the given processing cycle, tag arrays corresponding to both the first subset of N storage arrays and the remaining subset of N storage arrays comprise the first group of memory cells, the first operating voltage is lower than the second operating voltage and all of the tag arrays (but not all of the data arrays) are accessed in parallel in the given processing cycle. Thus, even in the event of a cache miss in the given processing cycle, information can still be obtained with regard to whether the required data is available in the remaining subset of N storage arrays prior to actually accessing that remaining subset of N storage arrays. Indeed, if it is established that the required data is not stored in the remaining subset of N storage arrays then the data can be retrieved directly from main memory without any requirement to power up the remaining subset of N storage arrays.

In some embodiments in which tag arrays corresponding to the first subset of the N storage arrays comprise the first memory cell group and tag arrays corresponding to the remaining subset of the N storage arrays comprise said second memory cell group and the first operating voltage is lower than the second operating voltage and the tag arrays corresponding to the first subset of said N storage arrays are accessed in said given processing cycle together with the first subset of N storage arrays whilst, in the event of a cache miss in the first subset of N storage arrays, tag arrays corresponding to the remaining subset of said N storage arrays are accessed in a processing cycle subsequent to the given processing cycle and in parallel with access to said remaining subset of said N storage arrays.

This conveniently enables the supply voltage of the tag arrays to be matched to that of the corresponding storage array such that those tag arrays having a higher supply voltage can be fabricated using smaller memory cells or a less complex memory configuration. This can potentially reduce the die area since there is no requirement to provide all of the tag arrays having a memory cell size (or configuration) that is adapted to improve reliability at the lower operating voltage associated with the power-saving mode.

In some embodiments where only the first subset of N storage arrays is accessed in a given processing cycle whilst the remaining subset of N storage arrays is accessed only in the event of a cache miss in a processing cycle subsequent to the given processing cycle, in the power saving cache mode, in the event of a cache miss corresponding to a cache access request when the first subset of N storage arrays is accessed, at least a portion of data from the first subset of storage arrays is stored in a buffer. This enables at least a portion of the first subset of N storage arrays to be free for storage of the most recently accessed data since the buffer provides for backup of the data stored in those storage arrays at the point in time when the cache miss occurred.

In some such embodiments where data from the first subset of N storage arrays is stored in a buffer in the event of an initial cache miss, if in a subsequent processing cycle there is a cache hit in the remaining subset of N storage arrays, then the data accessed as a result of the cache hit is stored in the first subset of N storage arrays in place of the data stored to the buffer. This readily ensures that the most recently used cached data is stored in the first subset of N storage arrays, which in turn improves the subsequent hit rate upon an initial cache access to the first subset of N storage arrays.

In some such embodiments, the data stored in the buffer is stored in the remaining subset of N storage arrays in a processing cycle subsequent to a processing cycle corresponding to the cache hit that occurred in the remaining subset of N storage arrays. This provides a swapping action similar in principle to a write back buffer in a filter cache because the data that previously was stored in the first subset of N storage arrays at the time of the initial cache miss is moved out of the first subset of N storage arrays and instead stored in the remaining subset of N storage arrays. Such a system is easy to implement since it is analogous to creating an exclusive filter cache.

In some embodiments, monitoring circuitry is provided for monitoring a hit rate for cache access requests in the first subset of N storage arrays. Monitoring the hit rate provides a reliable metric for determining dynamically when it is appropriate to use the standard cache mode rather than the power-saving cache mode.

Some such embodiments comprising the monitoring circuitry further comprise mode control circuitry for dynamically controlling when the cache switches between the power-saving mode and the standard mode depending upon the hit rate. This provides a convenient means to dynamically switch between power saving and standard modes based upon current processing requirements. In some such embodiments the mode control circuitry causes the cache to switch from the power saving mode to the standard mode when the hit rate is below a predetermined threshold. This effectively controls switching to the standard performance mode from the power-saving mode in a manner that is easy to implement.

In some such embodiments, the monitoring circuitry controls the dynamic switching between the power-saving mode and a standard mode depending upon information from a cache replacement policy algorithm. In particular embodiments of this type, the cache replacement policy is a Least Recently Used (LRU) policy. This has the advantage that information that would in any case be gathered to implement the LRU policy can be conveniently re-used to guide the dynamic switching between power-saving mode and standard mode of the cache.

In some such embodiments comprising a monitoring circuitry, when the cache is operating in the standard mode, a first count of cache hits occurring in a most recently used cache block and a second count of cache hits occurring in a cache block other than the most recently used cache block are both maintained. The LRU policy in any case identifies in the most recently used cache block in the cache tags and the most recently used blocks would typically be in the first subset of N storage arrays when the cache is operating in the low-power mode. Where the swap buffer is used this provides a convenient means for calculating when it is appropriate to switch from the standard mode back to the power-saving mode.

Some such embodiments comprise processing circuitry for calculating a miss rate corresponding to the first subset of N storage arrays using the first count and the second count. In some such embodiments the mode control circuitry causes the cache to switch from the standard mode to the power-saving mode when the miss rate is below a predetermined threshold. This is straight-forward to implement yet effectively enables determination of when to switch from standard mode to power-saving mode. It will be appreciated that the operating voltages (supply voltages) of the first memory cell group and the second memory cell group can be chosen to be any desired operating voltages and although the first and second voltage domains are different, enabling different supply voltages to be applied to the memory cell groups of the respective regions, it will be appreciated that substantially the same supply voltage could be used for both the first voltage domain and the second voltage domain. However, in some embodiments, one of a first operating voltage corresponding to the first voltage domain and a second operating voltage corresponding to the second voltage domain is substantially equal to a threshold operating voltage of the corresponding memory cell. This offers improved energy savings by operating the memory cell on the threshold of reliability at an operating voltage that is considerably lower than that which would be used in standard memory cells.

According to a second aspect the present invention provides an apparatus for processing data arranged to operate at a plurality of different processing performance levels, said apparatus comprising:
    processing circuitry;
    a cache memory comprising a storage array having a plurality of cache lines and a tag array providing an index of memory locations associated with data elements currently stored in said cache memory, said cache memory comprising a first memory cell group configured to operate in a first voltage domain and a second memory cell group configured to operate in a second voltage domain different from said first voltage domain; and
    control circuitry for controlling said processing circuitry to operate at one of said plurality of different performance levels depending upon processing requirements and for controlling said cache memory to switch between a standard performance level corresponding to a standard cache mode and a power-saving performance level corresponding to a power-saving cache mode, in which less power is consumed relative to said standard cache mode.

According to a third aspect, the present invention provides a method of caching data in a cache memory comprising a plurality of memory cells forming a storage array having a plurality of cache lines and a tag array providing an index of memory locations associated with data elements currently stored in said storage array and a cache controller coupled to said cache memory, said method comprising:
    performing, in response to a cache access request from processing circuitry, a cache lookup with reference to said cache tag array;
    configuring a first memory cell group of said plurality of memory cells to operate in a first voltage domain and configuring a second memory cell group of said plurality of memory cells to operate in a second voltage domain different from said first voltage domain.

According to a fourth aspect, the present invention provides a method of processing data in an apparatus for processing data arranged to operate at a plurality of different processing performance levels and having processing circuitry and a cache memory having a storage array comprising a plurality of cache lines and a tag array providing an index of memory locations associated with data elements currently stored in said cache memory, said cache memory having a first memory cell group configured to operate in a first voltage domain and a second memory cell group configured to operate in a second voltage domain different from said first voltage domain, said method comprising:
    controlling said processing circuitry to operate at one of said plurality of different performance levels depending upon processing requirements; and
    controlling said cache memory to switch between a standard performance level corresponding to a standard cache mode and a power-saving performance level corresponding to a power-saving cache mode, in which less power is consumed relative to said standard cache mode.

Various other aspects and features of the invention are defined in the appended claims.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
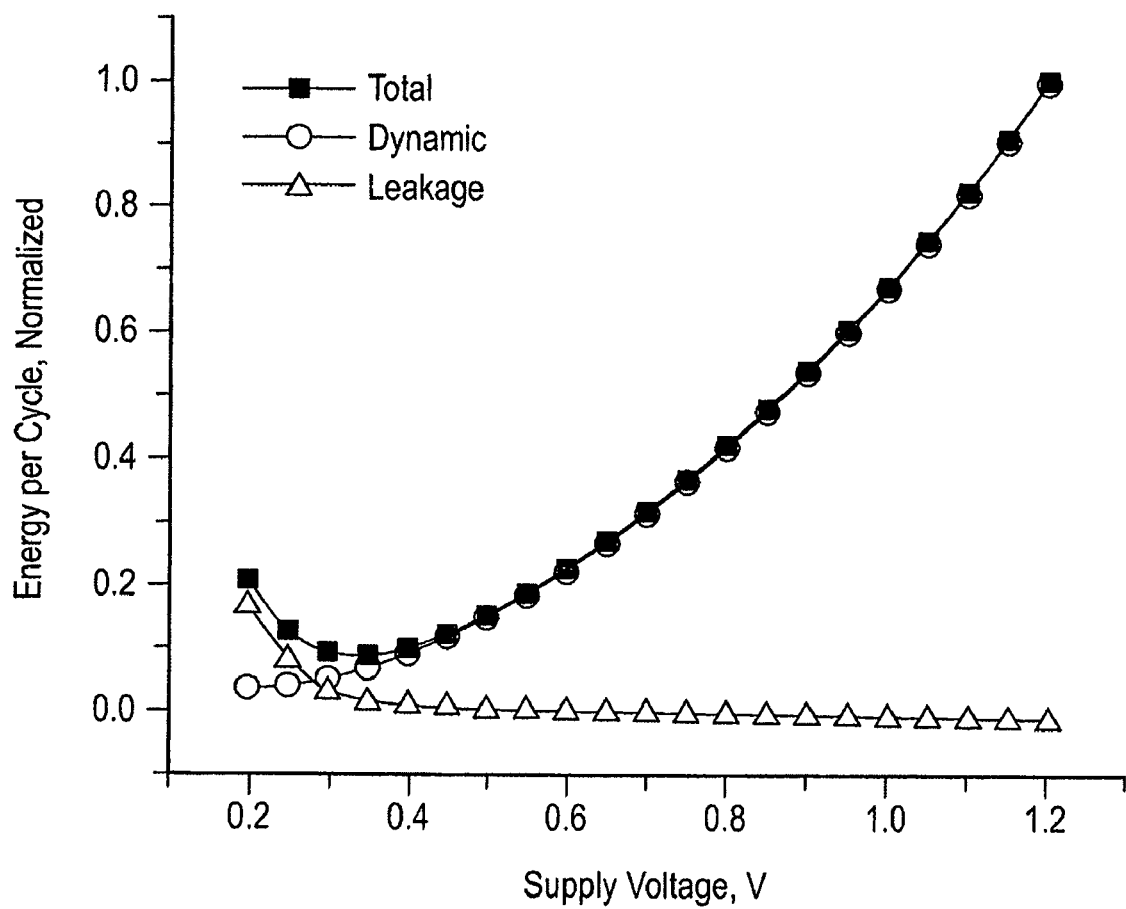
FIG. 1 is a graph of normalised energy per cycle against supply voltage which schematically illustrates the impact of supply voltage scaling of the memory cell on energy.

Battery life is an important concern for modern embedded processors. Supply voltage scaling techniques can provide an order of magnitude reduction in energy. Current commercial memory technologies have been limited in the degree of supply voltage scaling that can be performed in order to meet yield and reliability constraints. This has limited designers from exploring the near threshold operating regions for embedded processors.

The proper sizing of memory cells can provide that the memory cell reliability in the near threshold supply voltage region matches that of a standard memory cell. However, this robustness comes with a significant area cost. These memory cells can be employed to build cache architectures that reduce energy consumption. Embodiments of the invention provide an embedded processor based on these new cache architectures that operates in a low power mode, with reduced impact on full performance runtime. The cache of one such embodiment uses near threshold tolerant cache ways to filter energy in addition to traditional (i.e. similar to previously known) cache ways to maintain performance. The access policy of the cache ways is then dynamically reconfigured to obtain an energy efficient performance with reduced runtime increase. Using near threshold cache architectures according to embodiments of the invention an energy reduction of 53% over a traditional filter cache can be expected. Simulation results for some embodiments (MIBerich benchmarks) have shown on average an 86% (7.3×) reduction in energy while in low power (10 MHz) mode with only an average 2% increase in runtime in high performance (400 MHz) mode. And for embodiments on which Specint applications were run, a 77% (4.4×) reduction in energy in low power mode with only an average 4.8% increase in runtime for high performance mode.

Power has become a first class design constraint, particularly in processors for embedded applications. New mobile devices are demanding more processing power, but battery lifetime still remains a critical concern. That creates a need for energy efficient embedded processors capable of handling a range of application or task performance demands. Embodiments can provide a core that has a high performance mode (or standard performance mode) that can complete time critical or compute intensive tasks quickly, but also provides a low power mode (or power-saving mode) that runs slowly and can complete non-critical tasks in an energy efficient manner. It will be appreciated that, regardless of the precise terminology used to refer to the two different modes, one key property is that one of the modes of the core (and corresponding cache memory system) uses less power than the other of the modes.

The use of near threshold and sub-threshold supply voltage scaling has been the focus of many different studies. Zhai et al. [20] proposed a sub-threshold sensor network processor and Wang et al. [16] designed a sub-threshold chip for FFT applications. Most of these previously known applications are small and require little cache/memory space. If these techniques are going to be used for larger embedded applications several issues should be addressed. Most importantly, because the core and memory exhibit very different requirements for voltage scaling, they should be handled differently. First, logic tends to have a higher activity factor than memory, leading to a different optimal (or at least most favourable) supply voltage for a given frequency target. This justifies the need for a separate supply voltage domain in order to achieve the optimal energy efficiency [6, 19]. Second logic is more robust under supply voltage scaling, needing very little additional sizing to maintain yield and function reliably. Memory cells on the other hand require substantial resizing in order to maintain reliable operation at low voltages [20]. Chen et al. [5] describes a method of determining the cell sizes necessary to maintain the same reliability levels for several different SRAM (Static Random Access Memory) cell topologies.

Embodiments of the present invention described below focus on the near threshold operating region, which is above 400 mV for the 130 nm technology node of the embodiment. The described embodiments do not include sub-threshold designs, but it will be appreciated that the present invention is not limited to designs operating at or above the characteristic threshold voltage of the memory cells and in alternative embodiments sub-threshold voltages can be used. The energy savings in the sub-threshold region is limited by the fact that devices slow down exponentially with decrease in threshold voltage.

Figure 2:
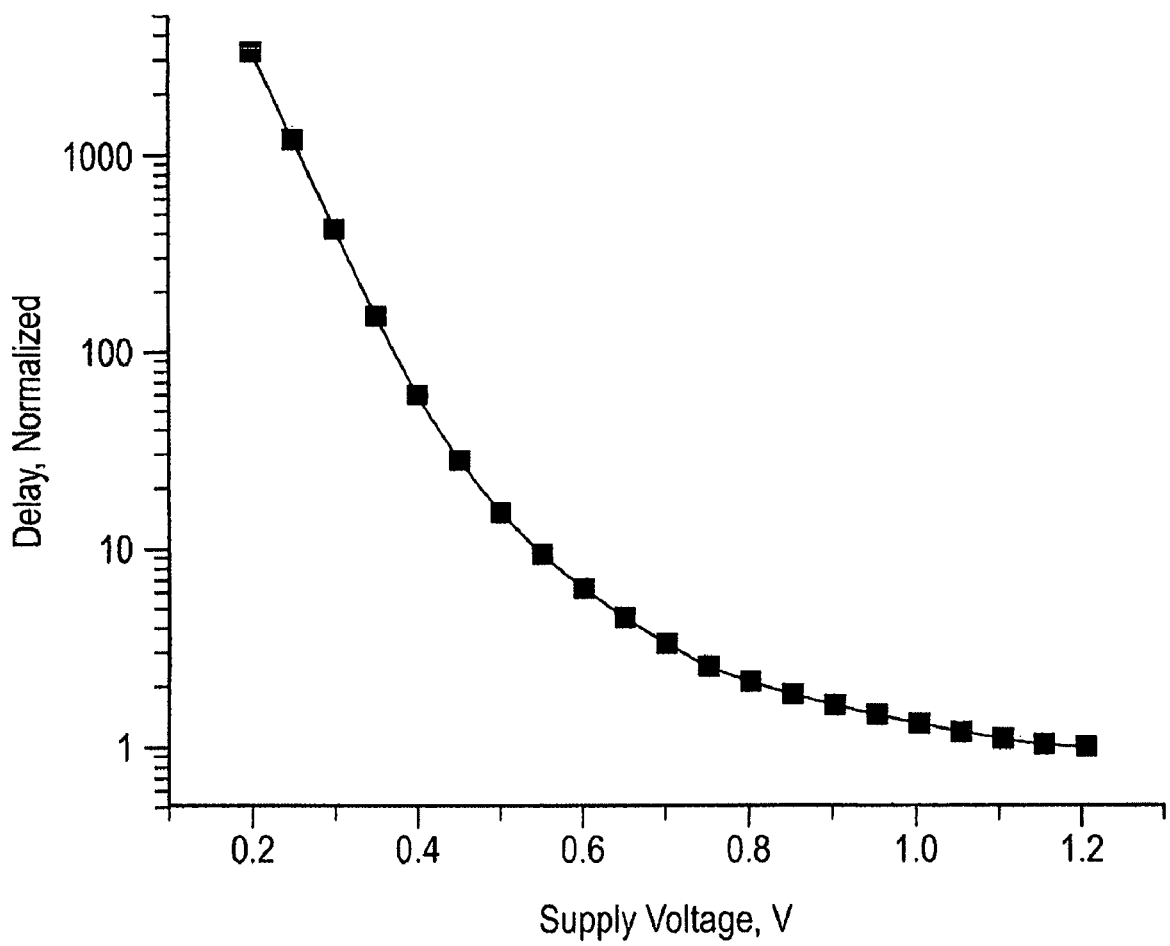
FIG. 2 is a graph of normalised delay against supply voltage, which schematically illustrates the impact of supply voltage scaling of a memory cell on delay.

FIG. 2 is a graph of normalized delay against supply voltage, which schematically illustrates the impact of supply voltage scaling of a memory cell on delay. The exponential slow down leads to extremely slow operating frequencies that show diminishing returns in energy savings. As the voltage is scaled even deeper into the sub-threshold region the total energy to complete the task becomes larger. This happens because at a certain voltage, the leakage energy of the circuit begins to dominate the total energy consumption resulting in a net increase in energy for all lower supply voltages [3, 17]. In addition to this, the required cell sizes for reliable SRAM operation become extremely large allowing only small memories on chip.

FIG. 1 is a graph of normalized energy per cycle against supply voltage, which schematically illustrates the impact of supply voltage scaling of the memory cell on energy.

The embodiments described below explore memory hierarchies in which some or all of the memory cells in the system are designed to scale their supply voltages into the near threshold operating region. This allows for increased energy savings in low power mode. Embodiments employing a filter cache [12] in the context of near threshold operation and supply voltage scaling is described below with reference to FIGS. 4A and 4B. A near threshold filter cache can reduce the energy of a traditional filter cache by 36%. However, the filter cache has the potential to impact the overall performance of the system in the high performance mode by increasing the runtime by nearly 20%.

The embodiments of FIGS. 5 and 6 (see below) employ a new cache architecture, which will be referred to as a "Reconfigurable Energy-efficient Near Threshold (RENT)" cache that reduces the runtime overhead in high (standard) performance mode while maintaining considerable energy savings in low power (power-saving) mode. The cache is composed of one near threshold tolerant cache way and several standard SRAM cache ways. In the standard cache mode all of the cache ways are accessed substantially simultaneously, but in the power-saving mode the near threshold tolerant cache way is accessed in the first cycle and only on a miss are the other cache ways accessed. In this manner the near threshold tolerant cache way acts as a shield to the other cache ways. If the miss rate in the near threshold tolerant cache way exceeds a threshold, then the cache is dynamically reconfigured to access all the cache ways in parallel, providing a single cycle access to all of the cache space. This will help to almost eliminate any runtime increase in high performance mode. By using this technique combined with some advanced access policies the RENT cache shows a 53% reduction in energy over a traditional filter cache. This results in a system that provides a 86% (7.3×) energy savings in low power mode with only an average 2% increase in runtime while in high performance mode.

A low voltage tolerant SRAM memory cell design will now be considered. Supply voltage scaling has been shown to be an effective way to handle lowering the energy consumption of logic circuits. There have been several cores built that show a quadratic savings in dynamic energy consumption with a delay degradation [21, 16]. These designs employ CMOS circuitry, which is quite resilient to supply voltage scaling. SRAM memory cells, on the other hand, do not voltage scale into the near and sub-threshold regions as easily. Several ultra-low energy designs have been implemented [18, 4, 15, 11] but require increased cell size. This increased cell size reduces the energy gain from supply voltage scaling, because the larger cells consume more power than the smaller cells. In addition, when the die size is held constant, the increased cell size reduces the total overall size of the memory structure. This increased cell size is done in order to maintain reliability levels, but until recently there was no formal method to guarantee reliable operation in near threshold memory structures.

By modeling process variation, especially random dopant fluctuations (RDF), and employing a modified Monte Carlo analysis, Chen et al. showed how to calculate the robustness of an SRAM cell design at near and sub-threshold supply voltages [5]. Because SRAM cells occur in large arrays, failure rates should be kept very low to ensure a reliable cache. For example, for 99% of 8 kB caches to be reliable it would require a bitcell failure rate of $1.57 \times 10^{-7}$.

The necessary cell size to maintain the same failure rate as a standard SRAM cell, termed "iso-robustness" can be calculated. In determining the iso-robust point the transistors are scaled individually to avoid read, write, and read-upset failures. The technology node for the embodiments described below is 130 nm and standard SRAM cells are assumed to operate reliably down to 800 mV. For the purposes of the robustness analysis according to the present technique, memory cells that operate at supply voltages below 800 mV are required to be sized to match the failure rate of a standard SRAM cell operating at 800 mV. A plot of several different SRAM topologies (differential six transistor; single-ended six transistor; and eight transistor) is shown in FIG. 3.

Figure 3:
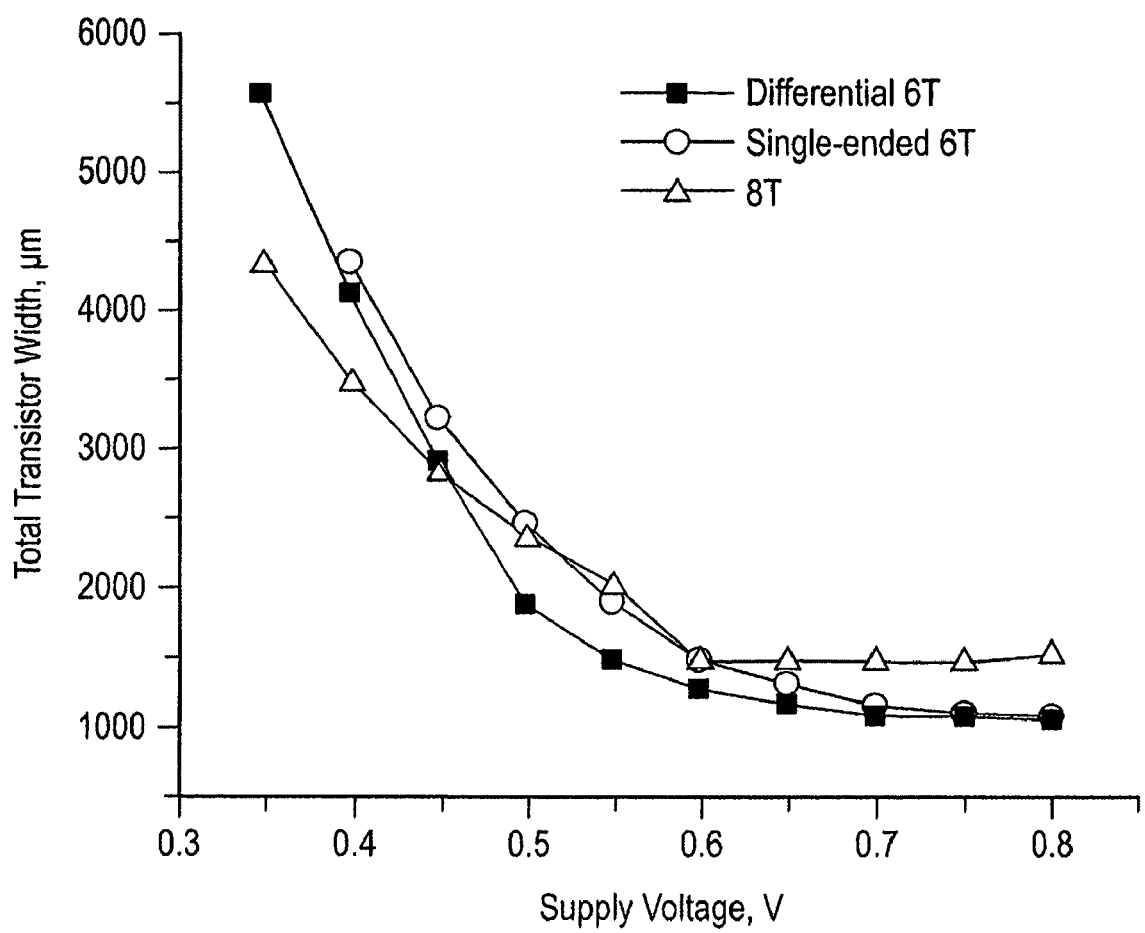
FIG. 3 is a graph of total transistor width against supply voltage, which schematically illustrates the SRAM memory cell area required at different supply voltages to maintain ISO-robustness.

The FIG. 3 graph schematically illustrates the necessary cell-area in terms of total transistor width to maintain iso-robustness for a given supply voltage. The three lines in the plot represent a standard 6Transistor (6T) SRAM cell, a single-ended 6T SRAM cell [18] and a 8Transistor (8T) SRAM cell [15]. It is possible to not only pick the proper supply voltage to meet the delay requirements, but to also pick the SRAM topology that provides the most area efficient solution. These considerations are relevant for the design of a low-power embedded microprocessor. The SRAM in these systems should be designed for reliable operation.

The present technique uses this analysis to determine what size to make an SRAM cell in order to have it operate reliably down to a given supply voltage. The increased cell size is likely to affect performance of a cache in two main ways. First, at full supply voltage the SRAM cell is likely to consume more energy and be slightly slower due to the increased size. Secondly, there is likely to be less total cache in the same die space. For a given a design frequency (of operation of the processor), a proper analysis is performed to avoid oversizing the SRAM cell and reduce the performance of the chip in non-power saving mode. Conversely it is important not to undersize the cell to avoid inadvertently increasing reliability problems in power savings mode.

Some energy efficient cache architectures according to the present technique will now be considered. The ability to voltage and frequency scale cores has provided an order of magnitude savings in energy [20, 16, 21]. However, supply voltage scaling of the memory system has been limited by the tolerance of the SRAM cell in previously known systems. Employing the SRAM cells discussed above, in combination with a voltage and frequency scaled core (i.e. processing circuitry), even more energy savings could be possible. Embodiments of the invention comprise a chip that can operate in two distinct modes. The first is a high performance mode (or "standard mode") where the system is fully powered and the core runs at a high frequency. The second mode is a power savings mode (or "power-saving mode"). In this mode the chip is frequency scaled to a slower performance target, and the supply voltage is dropped to reduce energy consumption.

Figure 4A:
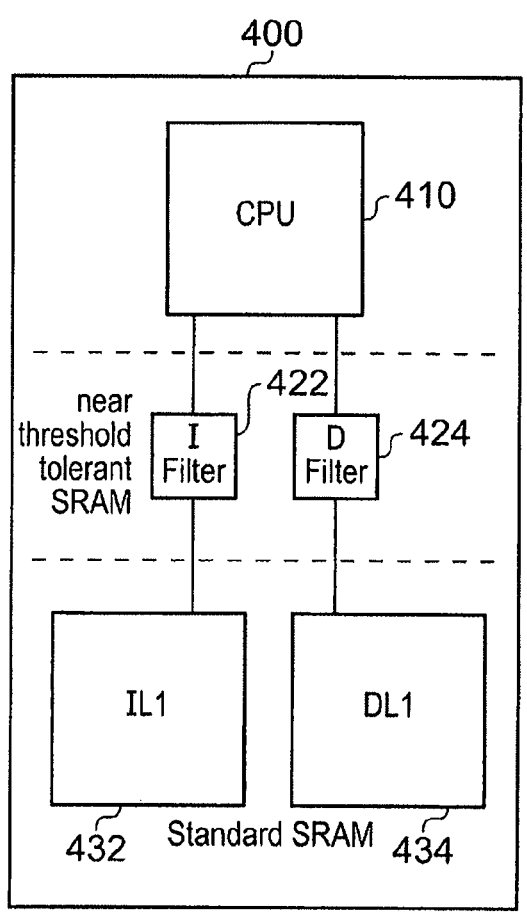
FIG. 4A schematically illustrates a chip having an embedded processor in which a cache memory comprises a filter cache and an L1 cache where the filter cache comprises cache memory cells arranged to operate in a first voltage domain whereas the L1 cache comprises a second group of memory cells configured to operate in a second different voltage domain.
Figure 4B:
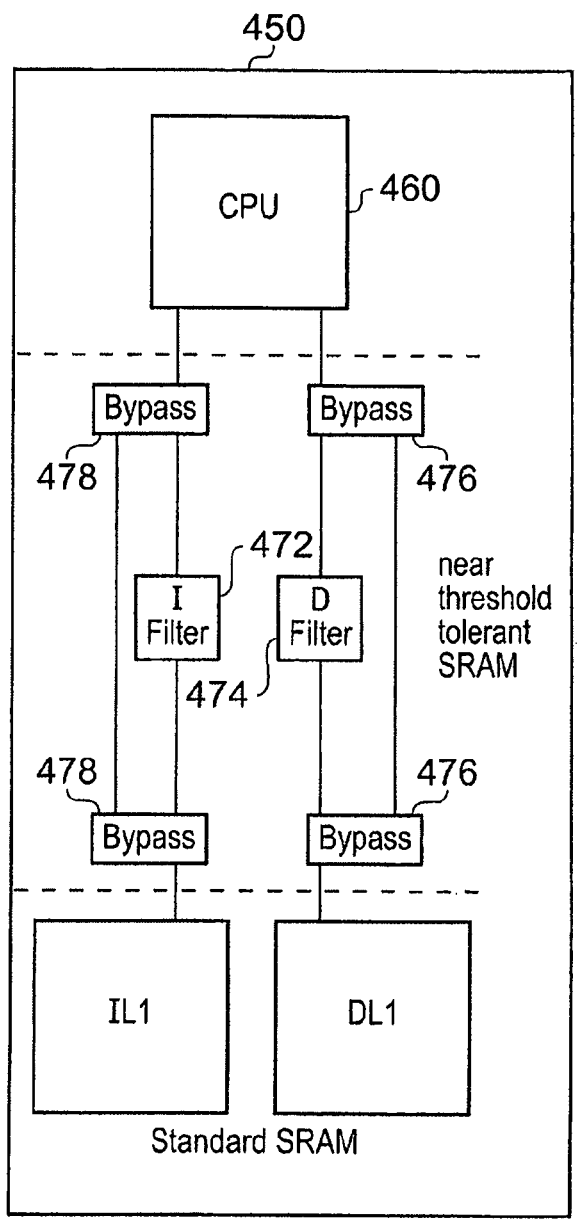
FIG. 4B schematically illustrates a chip having an embedded processor having a cache arranged such that a filter cache operates at one operating frequency and a level 1 cache operates at a second different operating frequency and the two cache types have different memory cell types and, in addition, bypass circuitry is provided to bypass the filter cache under certain processing conditions.

Due to the differing activity factors for logic and memory, the core and caches are operated in different voltage domains [6, 19]. In addition, providing two memory voltage domains allows more complex architectures that involve both near threshold tolerant SRAM, and standard SRAM. The near threshold tolerant SRAM is used to create energy efficiency, while the standard SRAM helps to provide larger capacity on chip since there is no need to increase the memory cell size to maintain reliability. This requires the addition of at most two additional supply voltage domains to the chip and associated voltage level converters. A diagram of the regions in which a chip might be partitioned is shown in FIGS. 4A and 4B (described in detail below). In FIGS. 4A and 4B, the core is operated in one supply voltage domain, the filter cache in a separate near threshold tolerant SRAM cell domain, and the Level 1 cache (L1) in a third domain. Level converters are used to cross the dotted lines separating the voltage domains.

These changes to the chip and SRAM cell design provide opportunities to explore more energy efficient cache hierarchies. Simply using near threshold tolerant cells in place of current cells allows the caches in a system to scale to much lower supply voltages, creating a dynamic energy savings at low frequencies. However the increase in the cell size is likely to reduce the total amount of cache available when the die size is held constant. This could negatively impact performance by increasing the number of off-chip accesses, which require large amounts of energy and have a long latency. This increase in latency could in turn slow the completion of the program, and prolong the leakage energy. At high frequencies, when the cache is operating at full supply voltage, the energy per access of the cache will likely be increased due to the larger cell sizes required to meet the iso-failure conditions set forth above. Three techniques will now be discussed for better use of the near threshold tolerant SRAM cells to reduce energy consumption. In particular:
(i) a near-threshold filter caches;
(ii) Reconfigurable Energy-Efficient near-Threshold (RENT) caches; and
(iii) RENT caches with parallel access to all cache tags in power-saving mode (i.e. "Alternative RENT caches".

First consider the near-threshold filter caches. Filter caches, a technique proposed in [12, 14], is a method to reduce cache energy. The idea behind filter caches is to place a small, low energy per access, cache in between the processor and the L1 cache. This cache then filters access to the larger, more energy hungry, L1 cache. Employing near threshold tolerant SRAM cells to design a filter cache would further reduce the energy even more. A diagram of what a near threshold filter cache architecture would look like is shown in FIG. 4A.

FIG. 4A schematically illustrates a chip having an embedded processor in which the cache memory comprises a first memory cell group configured to be accessible at a first operating voltage and a second memory cell group configured to be accessible at a second operating voltage. In this case the cache has only a single mode of operation (although the processing circuitry can operate at a plurality of different operating frequencies/voltages). A chip 400 comprises processing circuitry 410, an instruction filter-cache 422, a data filter-cache 424, an instruction level 1 cache 432 and a data level 1 cache 434. The instruction and data filter caches 422, 424 act as filters to accesses to the level 1 instruction and data caches 432, 434 respectively. Thus the filter caches 422, 424 are always accessed prior to accessing the level 1 instruction and data caches 432, 434. The filter caches offer more rapid access due to their comparatively smaller size relative to the level 1 caches 432, 434.

In previously known systems employing filter caches, the memory cells of the filter caches 422, 424 would be substantially identical to the memory cells of the level 1 instruction and data caches 432, 434. In particular, the memory cells of both caches would be configured to operate at identical operating voltages and would have the same memory cell sizes and memory cell configurations. However, according to the embodiment of FIG. 4A, the memory cells of the filter caches 422, 424 correspond to a first memory cell group having a first set of memory cell characteristics and are designed to operate in a first voltage domain, whereas the level 1 instruction and data caches 432, 434 correspond to a second memory cell group having different memory cell characteristics from the first memory cell group and being designed to operate in a second voltage domain that is different from the first voltage domain. In this particular embodiment, the instruction and filter caches 422, 424 are designed to operate close to, but just above the characteristic threshold voltage (i.e. the threshold associated with the so-called iso-robust point as discussed above) of the memory cells of the first memory cell group whereas the level 1 instruction and data cache 432, 434 are designed to operate at a higher operating voltage that is not close to the threshold.

Due to the differing characteristics (so called "activity factors") for processing logic and for memory cells, the processing circuitry and the cache memory cells of the arrangements of FIGS. 4A and 4B need to be operated in different voltage domains. Accordingly in the arrangement of FIG. 4A the processing circuitry 410 corresponds to a first voltage domain, the filter caches 422, 424 correspond to a second voltage domain that is different from a first voltage domain whilst the level 1 instruction and data caches 532, 534 correspond to a third voltage domain that is different from both the first voltage domain and the second voltage domain.

FIG. 4A clearly shows the partitioning between the different voltage domains with there being a division between the processing circuitry 410 and the two filter caches 422, 424 and a further division between the two filter caches 422, 424 and the level 1 instruction and data caches 432, 434. Voltage level converters (not shown) are employed to enable communication across the dotted lines separating the three different voltage domains. The use of near-threshold tolerant SRAM cells in the filter caches 422, 424 of FIG. 4A enables the cache on the chip 400 to scale to a lower supply voltage without compromising the reliability of the memory cells. This in turn allows energy savings to be made when the processing circuitry 410 is operating at lower frequencies.

The filter caches 422, 424 have lower energy per cache access than an access to data in the level 1 caches 432, 434. The use of a filter cache per se, even a known filter cache having a substantially identical memory cell configuration to the level 1 cache, offers energy savings relative to using a system having a level 1 cache without any filter cache, in particular, if there is a reasonable hit rate in the filter cache then the energy saved from each access to the filter cache reduces the overall cache energy consumption. Arranging the cache as shown in the embodiment of FIG. 4A, such that the filter cache memory cells have a different and lower operating voltage than the memory cells of the level 1 caches 532, 534 offers further energy savings by reducing even further the energy per access required for accesses to data in the filter caches 422, 424. However, it will be appreciated that in the event that the miss rate in the filter caches 422, 424 increases above a certain threshold then the overall energy consumed by the cache will go back up due to a requirement to access both the filter caches 422, 424 and subsequently the level 1 caches 532, 534 in the event of a miss in the filter caches 422, 424. All cache accesses that miss in the filter caches 522, 524 will take more cycles (e.g. two cycles instead of 1) than cache access that hit in the filter caches 422, 424.

One potential drawback of using filter caches is that if the memory access pattern creates a high miss rate in the filter cache, then the overall system energy goes back up due to accessing both the filter and L1 cache. The system performance is also degraded because all cache accesses that miss in the filter cache but hit in the L1 cache take two cycles instead of one. To overcome these drawbacks a simple bypass network could be employed to bypass the filter cache when the miss rate in the filter cache is too high. FIG. 4B provides an illustration of what a bypass filter cache would look like.

FIG. 4B schematically illustrates a chip having cache memory system having two different memory cell groups having two different respective operating voltages similar to that illustrated in FIG. 4A, with the exception that in FIG. 4B bypass circuitry is provided to bypass the filter caches. The chip 450 comprises processing circuitry 460; an instruction filter cache 472; a data filter cache 474; a level 1 instruction cache 482; and a level 1 data cache 484.

Comparison with the arrangement of FIG. 4A shows that the arrangement of FIG. 4A additionally comprises bypass circuitry 476 arranged to enable the data filter cache 474 to be bypassed and providing direct access to the level 1 data cache 484. Similarly the bypass circuitry 478 is provided to enable bypassing of the instruction filter cache 472 allowing direct access to the level 1 instruction cache 482. The chip 450 operates such that when the miss rate in the filter caches 472, 474 is determined by a monitoring algorithm (not shown) within a cache control mechanism to be too high, then the bypass circuitry 476, 478 is enabled so that there is no requirement to access the filter caches 472, 474 prior to accessing the level 1 caches 482, 484.

Although the bypass circuitry 476, 478 partially alleviates the problem of increased energy consumption during periods of data processing when the hit rate in the filter caches 472, 474 is likely to be low, provision of the bypass circuitry has the potential disadvantage that the die area on the chip consumed by the filter caches 472, 474 is not being effectively used when the bypasses are implemented.

Now consider Reconfigurable Energy-Efficient Near Threshold (RENT) caches. Although naively employing a near threshold filter cache provides great energy savings, there are new architectures that can provide even further savings. A drawback of the bypass filter cache design is that when the filter cache is being bypassed, a portion of the cache space is not being used. That means there is effectively less total cache space on the chip, leading to a larger number of off-chip accesses. These off-chip accesses require large amounts of energy and have a long latency. These longer latencies can lead to an increase in runtime for the program, prolonging leakage energy and degrading performance. In order to minimize (or at least reduce) the amount of cache space lost and the performance degradation that occurs from using near threshold tolerant SRAM cells, while still maintaining the energy efficiency of the filter cache, a new cache architecture according to an embodiment of the invention is shown in FIG. 5 and FIG. 6.

Figure 5:
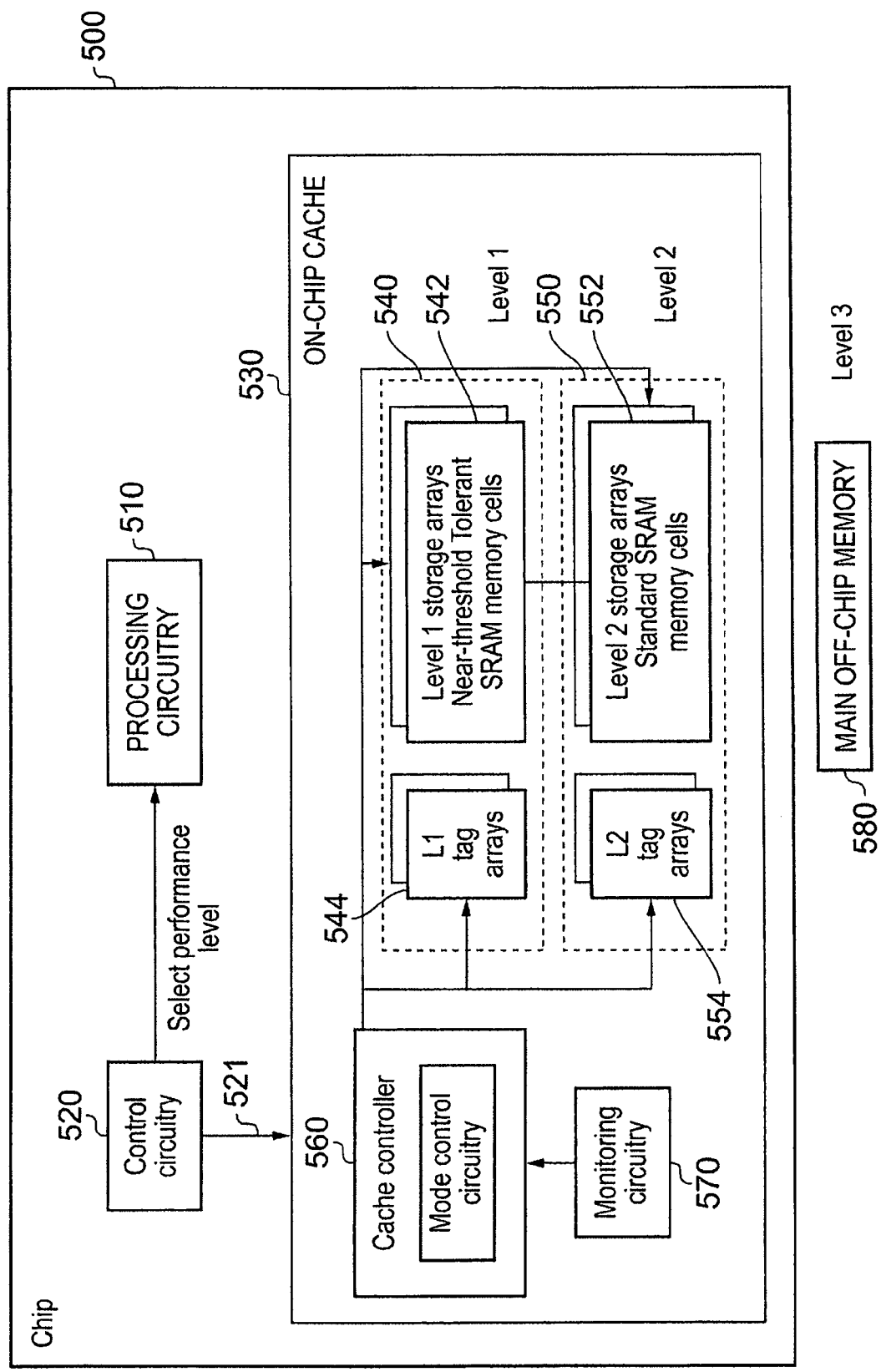
FIG. 5 schematically illustrates a data processing apparatus according to an embodiment of the present invention arranged to operate in both the standard mode and the power-saving mode and in which a first memory cell group of the cache memory is accessed similarly to a filter cache.

FIG. 5 schematically illustrates a data processing apparatus having a cache memory system according to an embodiment of the present invention. A data processing apparatus comprises a chip 500 having embedded processing circuitry 510. In addition to the processing circuitry 510 the chip 500 also comprises: control circuitry 520 and an on-chip cache 530. The on-chip cache 530 itself comprises: a level 1 cache memory 540, a level 2 cache memory 550; and a cache controller 560 having mode control circuitry 562 and monitoring circuitry 570.

The level 1 cache 540 comprises level 1 tag arrays 544 and level 1 storage arrays 542 formed from near-threshold tolerant SRAM memory cells. The level 2 cache 552 comprises level 2 tag arrays 554 and level 2 storage arrays 552 comprising standard SRAM memory cells, which operate at voltages well above a threshold voltage characteristic of the individual constituent memory cells.

The apparatus of FIG. 5 also comprises main off-chip memory 570, which is accessed in the event that a hit is not found in either the level 1 cache memory 540 or the level 2 cache memory 550. The processing circuitry 510 of the chip 500 is configurable to operate at a plurality of different performance levels i.e. at a plurality of different operating frequencies (and corresponding operating voltages) depending upon the processing requirements at a given time. Thus, for example, if a time-critical application is currently executing, then the processing circuitry will be configured to operate in a standard performance mode at an operating frequency and corresponding voltage that are high relative to the corresponding parameters in a power-saving mode of operation. Switching between different processor performance levels is controlled by the control circuitry 520, which implements one or more performance control algorithms that monitor previous and current processing requirements and select one of the plurality of performance levels according to predictions made by those performance-controlling algorithms. The control circuitry 520 is also used to supply a performance control signal 521 to the on-chip cache 530, which can be used to influence the mode control circuitry 562 of the cache control 560 in making a selection of an appropriate cache performance level.

Note that the performance level of the processing circuitry 510 can be set independently of the setting of the cache performance level. Thus, for example, the processing circuitry 510 could be set to operate in the standard performance mode whereas the on-chip cache 530 could be controlled to operate in the power-saving mode or vice versa. However, in many cases there is likely to be a correlation of the processing circuitry 510 operating in a standard performance mode and the on-chip cache 530 operating in a standard performance mode.

The memory system of the data processing apparatus illustrated in FIG. 5 has three hierarchical levels. In particular, the level 1 cache 540 corresponds to a first hierarchical level, the level 2 cache 550 corresponds to a second hierarchical memory level and the main off-chip memory corresponds to the third hierarchical memory level. The nature of the memory cells in the on-chip cache 530 and the size of the cache makes memory accesses to the on-chip cache 530 much more rapid in terms of processing cycles than access to the main off-chip memory 580, which must be accessed via a bus.

A cache controller 560 is responsive to a request from the processing circuitry 510 to perform a cache access operation (read or write) by looking up at least the level 1 tag arrays 544 to determine whether data corresponding to a given memory address is stored in a corresponding location in the level 1 storage arrays 542. The number of individual data arrays in the L1 tag arrays 544 is equal to the number of individual storage arrays in the level 1 storage arrays 542 since the on-chip cache 540 is an N array set associative cache. In fact there are N tag arrays and N storage arrays. The L1 tag arrays 544 and the L2 tag arrays 554 provide a mapping between an incoming memory address, (in this case a 32-bit address) and a data storage location within the corresponding storage arrays 542, 552. The processing circuitry 510 selects a particular set of cache lines using a "data RAM index" comprising a subset of the address bits of the 32-bit memory address. Within each data RAM storage array 542, 552 there are N cache lines that could map to a given memory address. The cache controller 560 uses a mapping algorithm to select one of the four cache lines within the set on a cache line fill operation.

The on-chip cache of FIG. 5 operates in two distinct modes: the power-saving mode and the standard mode. In the standard mode of operation all of the cache tags of both the L1 tag arrays 544 and the L2 tag arrays 554 are read out in parallel together with the data from both the level 1 storage arrays 542 and the level 2 storage arrays 552. Effectively, this means that level 1 and level 2 of the cache hierarchy become degenerate (i.e. same level) in the standard mode. However, in the power-saving mode, the level 1 storage arrays 540 are accessed prior to the level 2 storage arrays 552, so that the level 1 storage arrays 542 serve as a sort of filter cache relative for the level 2 storage arrays 552.

When performing a given cache access operation in response to a request from the processing circuitry 510 when the cache is in the power-saving mode all of the N level 1 tag arrays 544 are accessed in parallel in order to determine whether the corresponding level 1 storage arrays 542 store the required data. At the same time that the level 1 tag arrays 544 are activated by supplying them with their corresponding operating voltage all of the level 1 storage arrays 542 are activated to output data in case the data should be located in one of the N storage arrays. In this particular embodiment in a first processing cycle only the level 1 tag arrays 544 and the corresponding level 1 storage arrays 542 are accessed. In a subsequent processing cycle, in the event of a cache miss in the level 1 cache 540, the level 2 tag arrays 554 and the corresponding level 2 storage arrays 552 are accessed substantially simultaneously.

However, in an alternative embodiment all of the level 1 tag arrays 544 and all of the level 2 tag arrays 554 together with all of the level 1 storage arrays 542 are accessed in the first of the above mentioned two processing cycles so that if there is a cache miss in the level 1 cache 540, the location of the required data in the level 2 cache 550 can be ascertained in advance of powering up the level 2 storage arrays 552. Only in the event of a cache miss in both the level 1 cache 540, and the level 2 cache 550 is an access performed to the main off-chip memory 580. In this case data retrieved from the off-chip memory 580 will subsequently be stored in one of the level 1 cache 540 or the level 2 cache 550 according to a particular cache replacement policy. In this particular embodiment, the cache replacement policy is a Least Recently Used replacement policy.

In the embodiment of FIG. 5, the N level 1 tag arrays 544 comprise near-threshold tolerant SRAM memory cells that match the memory cells of the level 1 storage arrays 542. Similarly, the level 2 tag arrays 554 comprise standard SRAM memory cells the same as the standard SRAM memory cells of the level 2 storage arrays 452. Thus, in this particular embodiment, the first memory cell group corresponds to the memory cells of both the L1 tag arrays 544 and the level 1 storage arrays 542 whilst the second memory cell group comprises the memory cells of the level 2 tag arrays 554 together with the level 2 storage arrays 552. The memory cells of the first memory cell group are accessible at a first voltage that is different from the operating voltage corresponding to the second memory cell group. The different characteristic operating voltages in this particular embodiment are associated with different respective memory cell sizes. In particular, the near-threshold tolerant SRAM memory cells of the level 1 cache 540 are comparatively larger in size that the standard SRAM memory cells of the level 2 cache 550. However, in an alternative embodiment, sizes of the memory cells in both the level 1 cache 540 and the level 2 cache 550 are substantially the same, whilst the actual configuration of the memory cells differs such that, for example, the first memory cell group comprises 8-transistor memory cells whilst the second memory cell group 550 comprises 6-transistor memory cells. The characteristics of the memory cells used in the two different cache levels 540, 550 are determined, at least in part by requirements for reliability of the cells at the designated operating voltage. As the operating voltage is reduced, the memory cells will typically have to be adapted to be more reliable, by increasing the memory cell size.

The mode control circuitry 562 of the cache controller 560 is arranged to control operation of the level 1 cache 540 and the level 2 cache 552 such that the cache operates in either the standard mode of operation or the power-saving mode of operation at any given time. In the standard mode of operation, there are effectively only two hierarchical memory levels since both the level 1 cache 540 and the level 2 cache 550 are accessed in parallel and treated as a single cache memory. In this case the main off-chip memory acts as a second level hierarchical memory level. However, in a power-saving mode of operation, the cache controller 560 controls the on-chip cache 530 to operate such that there are three hierarchical levels such that the level 1 cache 540 is accessed in a first processing cycle, the level 2 cache 550 is accessed in a subsequent processing cycle and only in the event of a miss in the level 2 cache is the main off-chip memory 580 accessed.

In this particular arrangement, switching between the power-saving mode and the standard mode is dynamically controlled by the cache controller 560 using the mode control circuitry 562. Determination of when to switch between the power-saving mode and the standard mode of the cache is made in dependence upon measurements made by the monitoring circuitry 570.

In effect, the monitoring circuitry 570 monitors the hit rate in the level 1 cache 540 whilst the on-chip cache 530 is operating in the power-saving mode such that if the actual hit rate falls below a predetermined threshold, the mode controller control circuitry 562 sends a signal to control the cache to operate in the standard mode.

If, on the other hand, the cache is currently operating in the standard mode, the monitoring circuitry 560 monitors the number of cache hits corresponding to a most recently use block in cache memory relative to a number of hits corresponding to a block other than the most recently used block in cache memory and uses this as a theoretical prediction of what of the hit rate would have been in the level 1 cache 540, had the data processing apparatus been operating in power-saving mode. The switch from the standard mode to the power-saving mode is dependent upon a parameter corresponding to a hit rate in the near-threshold tolerant SRAM memory cells of the level 1 storage arrays 440.

The control circuitry 520 can configure the processing circuitry 510 to operate at one of a plurality of different processing levels (i.e. one of a plurality of different processing frequencies and corresponding operating voltages). The operating voltage of the processing circuitry 510 is controlled independently of the mode of the on-chip cache 530. However, there is also a possibility that the control circuitry 521 could influence the mode control circuitry 562 of the on-chip cache so that the dynamic switching between the standard mode and the power-saving mode of the cache is not dependent upon the output of the monitoring circuitry 570 alone but is also dependent upon a current performance level of the processing circuitry 510.

Figure 6:
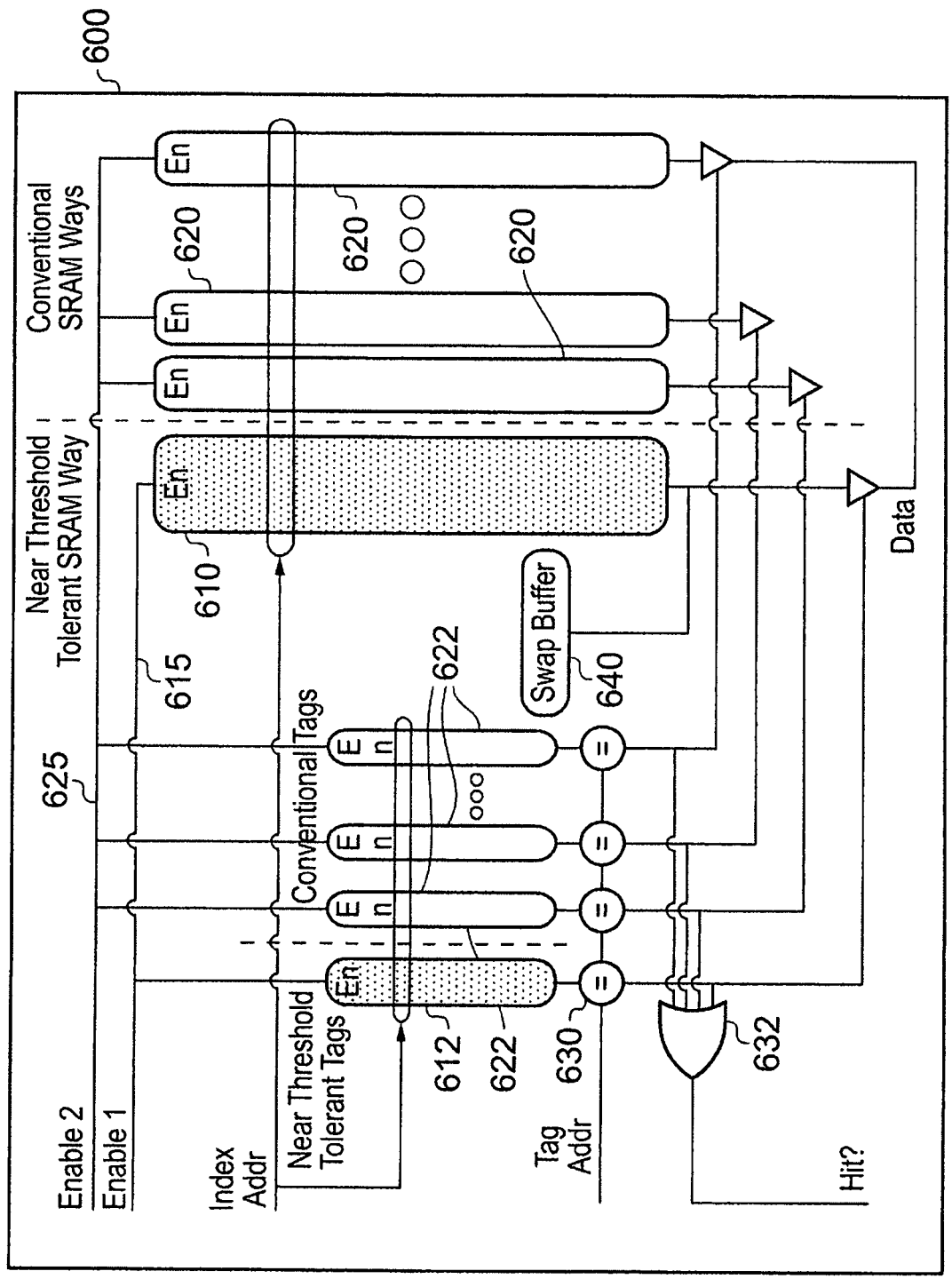
FIG. 6 schematically illustrates a more detailed view of the cache of the apparatus of FIG. 5.

FIG. 6 schematically illustrates a portion of the cache memory 530 of FIG. 5 in more details. The cache memory 600 comprises a first memory cell group comprising a near-threshold tolerant SRAM array (data array) 610 and a corresponding tag array 612 comprising near-threshold tolerant tags. It also comprises a plurality (N−1) conventional SRAM ways (data arrays) 620 and a corresponding set of N−1 conventional tag arrays 622. A swap buffer 640 is supplied for storage of data and a logical OR gate 632 is provided to perform a comparison between a tag address and a portion of a memory address corresponding to a data access request from the processing circuitry (not shown). A plurality of comparators 630 perform a comparison corresponding to a memory address look up in the tag RAM arrays 612, 622.

In the cache memory system 600 of FIG. 6, the first tag array 612 and the first data array 610 are supplied by a first enable signal 615 at a first operating voltage whilst the remaining N−1 conventional tag arrays 622 and the corresponding conventional SRAM ways 620 are supplied via a second enable signal 625 operating at a second operating voltage higher than the first operating voltage. When the cache 600 is operating in the standard mode of operation, a first voltage is supplied via the first enable signal 615 and a second voltage is applied substantially simultaneously via the second enable signal 625 such that all of the tag arrays 612, 622 are activated in parallel together with all N arrays of the data arrays 610, 620. Accordingly, in the standard mode of operation all of the memory cells of the cache memory 600 are activated in parallel. This differs from the filter-cache arrangement of FIG. 4B, where in the event that the bypass circuitry is arranged to provide a bypass of the filter caches, only a subset of the total number of memory cells of the cache memory are actually activated.

However, in a power-saving mode of operation, the cache 600 effectively acts like a filter cache, since only a subset 612 of the tag arrays and a corresponding subset of the data arrays 610 are accessed upon a first processing cycle and the remaining tag arrays 622 and corresponding data arrays 620 are accessed in parallel in a subsequent processing cycle. Thus, in the case of a power-saving mode of operation, only the first enable signal 615 is supplied to the cache memory whilst the second enable signal 625 is blocked. If there is a cache hit during this first processing cycle then there is no need to subsequently activate the second enable signal 625, since the requested data will already have been accessed.

However, if there is a cache miss on the first processing cycle, which means that the data cannot be accessed in the near-threshold tolerant SRAM array 610, there will be a requirement in the following processing cycle to activate the enable signal 625 to perform a look up of the N−1 conventional tag arrays 622 to determine if the data can be accessed in the remaining N−1 conventional SRAM ways 620. Only in the event of a cache miss in the conventional SRAM ways 620 will off-chip memory have to be accessed.

The OR logic gates 632 has an output that provides an indication of whether a match has been identified between the portion of a memory address corresponding to a data access and a tag address within the tag RAMs 612, 627. In the event of a hit in one of the tag arrays 612, 622 the appropriate cache array from within 610 or 620 will be enabled to output data onto the data bus for supply to the processing circuitry (not shown).

The swap buffer 640 is used in the event of the cache miss in the near-threshold tolerant SRAM array 610 to store a portion of data currently stored in the near-threshold tolerant SRAM array 610 to allow that data to be replaced by data corresponding to the cache hit that is subsequently retrieved from one of the conventional SRAM ways 620. In particular, the requested data from one of the conventional SRAM ways 620 will be copied into the near-threshold tolerant SRAM array 610 and the data previously stored in the swap buffer 640 is stored in a location within the convention SRAM array 620 corresponding to the data hit. Thus a swap is performed between data in the conventional SRAM way 620 corresponding to a cache hit and data previously stored in the near-threshold tolerant SRAM array.

In this particular embodiment, the memory cells of the near-threshold tolerant tag array 612 and the near-threshold tolerant SRAM array 610 are larger than the memory cells corresponding to the conventional tag arrays 622 and the conventional SRAM way 620. Thus, in the arrangement of FIG. 6, a subset of the plurality N of cache ways is operated at a near-threshold voltage whilst the remainder of the cache ways are operated at a different and higher voltage.

The arrangement of FIG. 6 differs from previously known cache way prediction mechanisms in that the use of the swap buffer 640 means that requested data, once located, is moved from the conventional SRAM way 620 to the near-threshold tolerant SRAM array 610 rather than being left in its current location. According to previously known way prediction mechanisms, the data would be left in its current location and the prediction algorithm would be modified to accommodate the cache miss.

Note that although, in the embodiment of FIG. 6, only the single near-threshold tag array 612 is accessed in parallel with the near-threshold tolerant SRAM way 610 in the first processing cycle, in alternative embodiments it is possible to access all of the tag arrays 612, 622 in parallel on the first processing cycle but to still only access a subset of the SRAM data arrays 610, 620. An embodiment of this type is described below with reference to FIG. 8.

The cache architecture of the embodiments of FIGS. 5 and 6 is called the Reconfigurable Energy-efficient Near Threshold (RENT) cache. The basic premise behind the RENT cache is as follows: There is one way of the cache and tags that is implemented with near threshold tolerant SRAM cells. The other ways of the cache and tags are implemented with standard SRAM cells. The cache will be operated in two distinct modes. We call these modes "conventional" (or standard) and "filtered" (or power-saving). In the conventional mode the cache is accessed in the regular manner. That is, the index portion of the address reads out all the cache tags and data from each way in parallel. The tags are then matched with the incoming address and the appropriate way of the cache is enabled to the output data bus. The new mode of operation, filtered mode, is designed to act like a filter cache. When filtered mode is in use only the first way, the near threshold tolerant way, of the cache and tags are accessed on the first cycle, via the enable 1 signal. If there is a hit, the cache will return the data and energy can be saved by only accessing this one way of the cache. If there is a miss on this first cycle access, then the data from the near threshold tolerant way is stored in a swap buffer. The enable 2 signal is then used and the rest of the cache is checked for a hit. When a hit is found, it is both enabled onto the data bus and written to the near threshold tolerant way. The data stored in the swap buffer is then written into the cache way where the hit occurred. This action essentially swaps the value in the near threshold tolerant way and the way in which there was a hit. This ensures that the most recently used (MRU) block is in the near threshold tolerant cache way. This swapping action is similar to the writeback buffer in the filter cache, and the design is no more complicated than creating an exclusive filter cache.

Figure 7A:
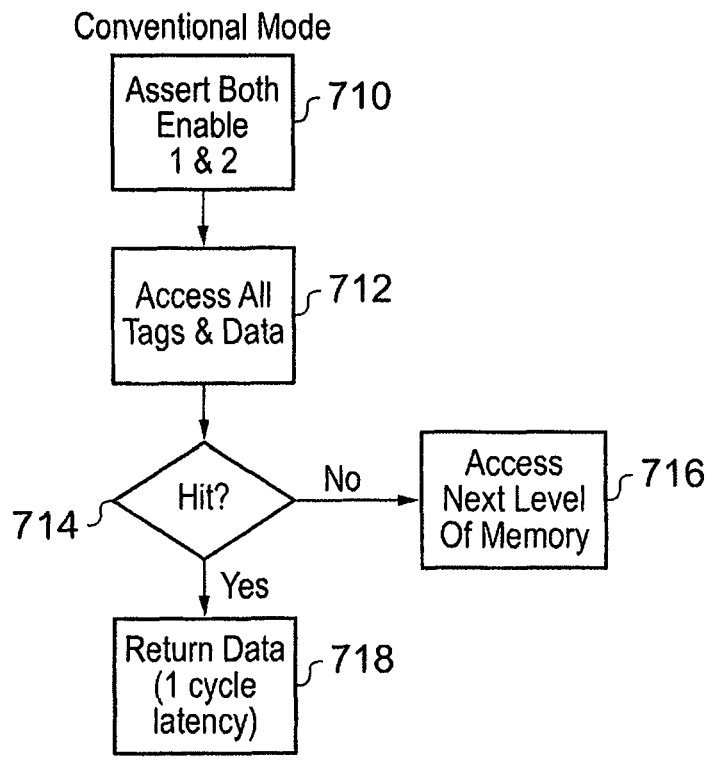
FIG. 7A is a flow chart that schematically illustrates a sequence of processing operations performed by the cache memory of FIG. 6 when operating in a standard mode.
Figure 7B:
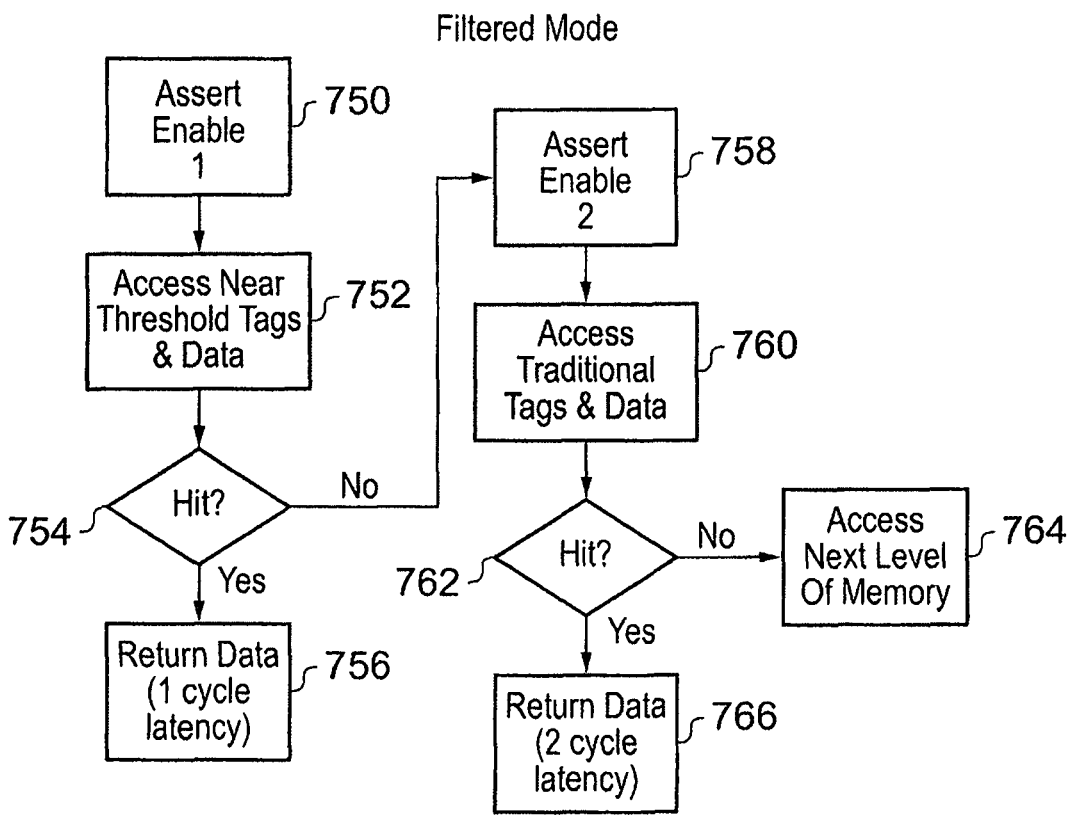
FIG. 7B is a flow chart that schematically illustrates how the cache memory of FIG. 6 operates in a power-saving mode.

FIGS. 7A and 7B are flowcharts of the two RENT cache access modes.

FIG. 7A is a flow chart that schematically illustrates a sequence of processing operations that are performed in the standard mode of the cache memory 600 of FIG. 6. The process begins at stage 710 where both the first enable signal 615 and the second enable signal 625 are asserted so that the N tag arrays 612, 622 and all of the N data arrays 610, 620 are accessed in parallel at stage 712. The process then proceeds to stage 714 where it is determined whether or not there is a match between the requested memory address and the tag address stored in the tag RAM 612, 622. If there is a miss in the tag arrays then the process proceeds to stage 716 where the next level of memory is accessed i.e. the off-chip memory (not shown in FIG. 6). If, on the other hand, there is a hit in one of the N arrays of the cache then the process proceeds to stage 718 where the data is returned to the processing circuitry with only a single processing cycle of latency.

FIG. 7B is a flow chart that schematically illustrates processing operations performed by the cache 600 of FIG. 6 in the power-saving (or "filtered") mode of operation of the cache. In this case, the process starts at stage 750 where a voltage is asserted via the first enable signal 615 but not the second enable signal 625. The process then proceeds to stage 752 where only a subset of the tag arrays and the data arrays are accessed. In particular, only the near-threshold tolerant tags 612 and the single near-threshold tolerant SRAM way 610 are accessed in parallel on the first processing cycle. The process then proceeds to stage 754 where it is determined whether or not there is a hit for the requested memory address. If there is a hit in the first cache way then the process proceeds to stage 756, where the data is returned to the processing circuitry with only a one cycle latency and no further accesses to the remainder of the cache memory (i.e. the conventional SRAM way 620) is required.

If, on the other hand, it is determined at stage 754 that the data is not present in the near-threshold tolerant SRAM array 610 then the process proceeds to stage 758 whereupon the second enable signal 625 is asserted in order to access in parallel the conventional N−1 tag arrays 622 and the conventional SRAM data ways 620. The parallel access to the conventional data ways 620 and the conventional tag arrays 622 occurs at stage 760 of the flow chart. The process then proceeds to stage 762, where it is determined whether or not there is hit in the N−1 conventional SRAM ways. If there is no hit in the conventional SRAM ways then the process proceeds to stage 764 where the next level of memory is accessed i.e. main memory will be accessed. There will be a considerable latency associated with accessing main memory because it involves transfer of data from off-chip.

If, on the other hand it is determined at stage 762 that the requested data is in fact present in one of the N−1 conventional SRAM ways 620 then the process proceeds to stage 766 where the requested data is returned to the processing circuitry. If the data is returned at stage 766 this involves a two processing-cycle latency, because the first enable signal 615 was asserted on a first processing cycle whereas the second enable signal 625 was asserted on the immediately subsequent processing cycle. Thus it can be seen that the data would be returned within two processing cycles in this case. Changing from conventional mode (see FIG. 7A) to filtered mode (see FIG. 7B) could be identified explicitly by the programmer, but greater savings are likely to be achieved if the cache was allowed to choose operating modes dynamically based on performance. This allows the cache to adapt to different program phases. It is relatively easy to decide when to switch from filtered mode to conventional mode. A counter is used to monitor the hit rate of the near threshold tolerant way, when the hit rate drops below a predefined threshold the cache changes modes. It is harder to decide when to transition back to the filtered mode of operation. In order to determine when to switch, we make use of some information from the replacement policy. If the cache is using a pseudo least recently used (LRU) replacement policy we can easily determine the MRU block. This is due to the fact that the pseudo-LRU policy always identifies the MRU block in the cache tags. If we track the number of times the cache hits on an MRU block and compare it to the number of times the cache hits on any non-MRU block, what the miss rate would have been for the near threshold tolerant cache way can be calculated. This follows because the MRU block would be in the near threshold tolerant cache way in filtered mode. When this hit rate exceeds some threshold, we can switch back to filtered operation. In both cases, after a switch has occurred a suitable number of accesses must be completed to allow the cache to reach a steady state before changing modes again. These methods require a very small overhead of two counters to track accesses and MRU/filter hits.

Now consider embodiments employing an "Alternative RENT cache" design. Further possible improvements can be made to the RENT cache of the FIG. 6 embodiment to reduce energy consumption. In filtered mode the additional ways of the cache are accessed in the second processing cycle (where the near-threshold tolerant ways are accessed in the first cycle). If instead the first cycle is used to check not only the first set of tags (corresponding only to threshold tolerant cache way(s), but all the other cache tags in the set as well, we could know by the second cycle the way in which the requested data resides. The Alternative RENT cache architecture is schematically illustrated in FIG. 8.

Figure 8:
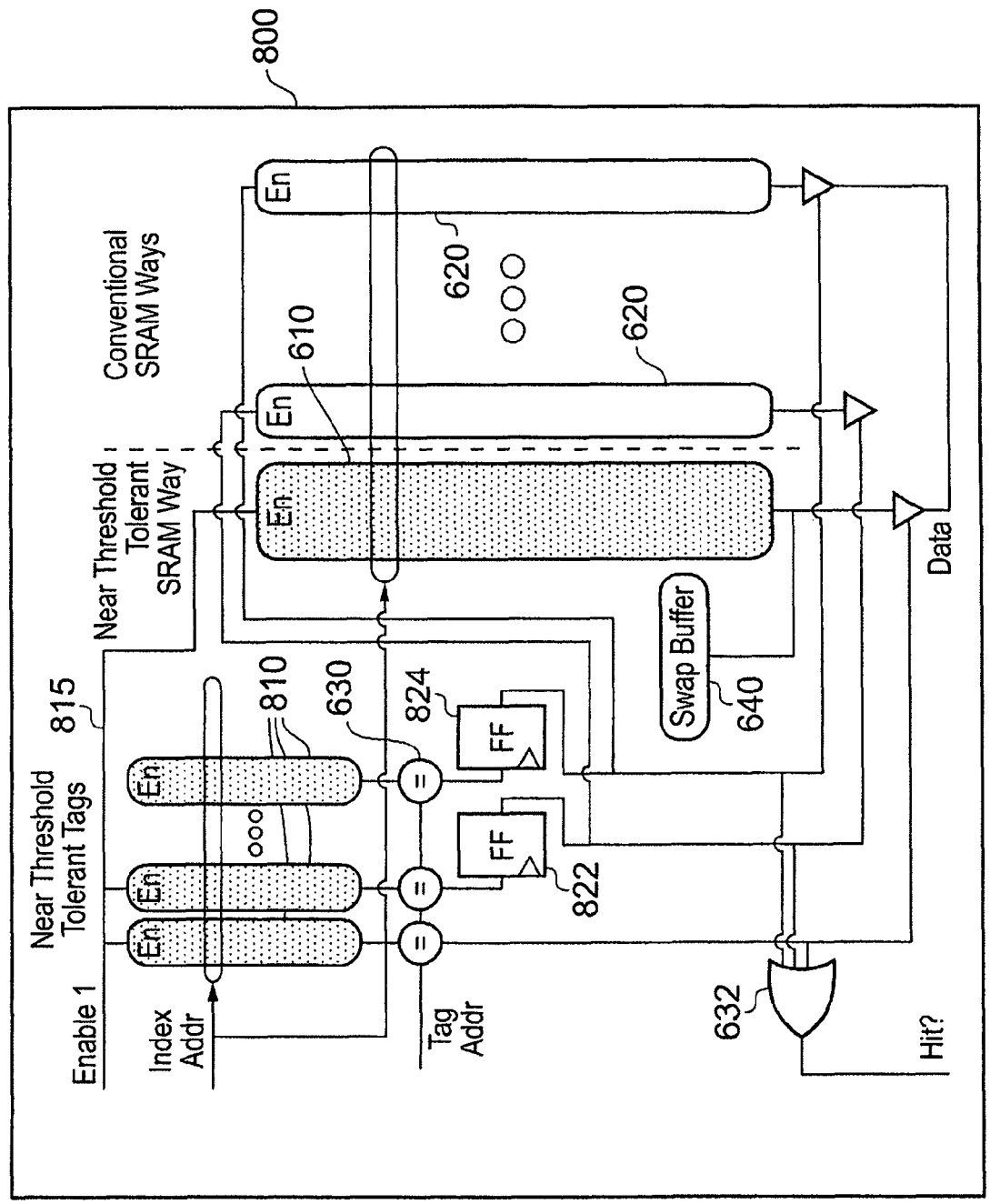
FIG. 8 schematically illustrates a cache memory similar to the cache memory of FIG. 6, with the exception that in a power-saving mode all of the cache tag arrays are accessed in parallel, together with a (near-threshold tolerant) subset of data arrays of the cache.

FIG. 8 schematically illustrates a cache memory system having both a power saving mode and a standard mode of operation similarly to the cache memory of FIG. 6 but in which in the power saving mode all of the N tag arrays are accessed in a first processing cycle, and only a subset of the corresponding SRAM data arrays are accessed in parallel in the same processing cycle.

In the cache memory 800 of FIG. 8 many of the components are identical to those described above with reference to FIG. 6 and these components have been given corresponding reference numerals. In particular, similarly to FIG. 6, the cache 800 of FIG. 8 has a single near-threshold tolerant SRAM data array 610 and a plurality N−1 of conventional SRAM data arrays 620. The arrangement of FIG. 8 also comprises the set of comparators 630 and the swap buffer 640 and the OR logic gate 632.

However, the arrangement of FIG. 8 differs from that of FIG. 6 in that all of the N tag arrays 710 are arranged to be near-threshold tolerant tags. The memory cell configuration of the N cache tag arrays 810 is identical to the memory cell configuration of the single near-threshold tolerant SRAM data array 610 but different from the memory cell configuration of the conventional N−1 data array 620.

Consider now the power saving cache mode in the arrangement of FIG. 8 where a first enable signal 815 is used to access the plurality N of near-threshold tolerant tags 810 together with the single cache array 610 having near-threshold tolerant SRAM cells. The remaining N−1 conventional SRAM ways are accessed via a different enable signal (not shown) having a higher voltage. In a first processing cycle all of the N cache tag arrays 810 are accessed in parallel with the single near-threshold tolerant SRAM way 610. In the event of a cache hit then the remaining N−1 conventional SRAM ways do not need to be accessed, but instead the data is returned within a single processing cycle.

However, in the event of a cache miss in the near-threshold tolerant SRAM way 610, since all of the N tag arrays 810 have been looked up in the initial processing cycle, the cache memory already has an indication of whether or not the requested data is stored in one of the conventional SRAM ways 620. If it is determined that there is a hit in one of the conventional SRAM ways then that data is accessed in the processing cycle immediately following the cycle in which the near-threshold tolerant SRAM way 610 was accessed by providing the second enable signal to a single conventional SRAM way 620 corresponding to the cache way that has been identified via the previous tag array access. If there is no hit in the conventional SRAM way then a memory access to a lower level memory (i.e. off-chip memory) is initiated.

The cache memory 800 is provided with first flip flop circuitry 822 and second flip flop circuitry 824, which are used to delay the enable of the conventional cache ways until a subsequent processing cycle. Although only two sets of flip flop circuitry 822, 824 are shown in FIG. 8, it will be appreciated that a flip flop is provided corresponding to each of the N−1 tag arrays that index data in the respective N−1 conventional SRAM ways 620, via the tag look-up. If there is a hit determined in one of the conventional SRAM ways 620, then that data will still not be accessed until a second processing cycle, where the first processing cycle is considered to be that associated with the access to the near-threshold tolerant SRAM data way 610.

In the event that the data is not present in the one of the conventional SRAM ways 620 or in the near-threshold tolerant SRAM way 610, performing the parallel tag look up of all N tag arrays 810 allows the stage of accessing the conventional SRAM ways to be bypassed, which reduces the off-chip access time by one processing cycle. It will be appreciated that the energy reduction of accessing all of the conventional SRAM ways 620 of the cache will be offset against the increase in the energy required for the look up of all of the cache tags in parallel.

Similarly to the cache for the arrangement of FIG. 6, in the standard cache mode (in contrast to the power saving cache mode described above) all of the near-threshold tolerant cache tags 810 and all N of the SRAM data arrays including the near-threshold tolerant data way 610 and the N−1 conventional SRAM ways 620 are accessed in a single processing cycle. Access to the subset comprising a single cache way is only performed in the power-saving mode of the cache system 800.

In the FIG. 8 embodiment all the tags are constructed using near threshold tolerant SRAM cells and they are all accessed on the first cycle (i.e. accessed in parallel). In parallel with the tag check, the near threshold tolerant way of the data cache is accessed. If there is a hit in the near threshold tolerant way the data can be provided in a single cycle, as before. If there is a miss, the tag check will provide which conventional way of the cache we should access on the second cycle. This reduces the energy consumed because on the second cycle only one way of the conventional cache is accessed. The flip-flops shown in FIG. 8 are used to delay the enable of the conventional ways until the next cycle, There is also the added benefit of knowing if the cache will miss after the first cycle. In this case an access to the next level of memory can be initiated one cycle earlier, reducing the off-chip access time by one cycle. Of course the energy reduction of accessing all the additional ways of the cache is traded off against the increase in energy for the tag look up. If the conventional ways of the cache are rarely accessed then the system may consume more energy with this Alternative RENT cache design.

A test methodology employed for testing operation of the above described embodiments will now be discussed and a set of simulation results for implementations of embodiments of the present invention will be presented. The simulations were performed by creating a system with two different operating modes. The first was a 400 MHz full power mode. The frequency was determined by the ARM® Ltd. Central processing unit (CPU) model used for energy analysis. The second mode, a low power mode, was chosen to operate at a 10 MHz clock frequency. This operating frequency was picked to provide a significant energy savings while still being fast enough to handle a wide range of simpler applications. A summary of the resultant design parameters for the system is in Table 1. A system with a split instruction and data cache was used, but to keep the analysis space small, the same sizes and types of caches were kept for both the instruction and data memory hierarchies. For all comparisons the die size was held constant.

The simulations were performed using a modified version of the M5 simulator [2]. The simulator was modified to incorporate the dynamic and leakage energy modelling necessary to determine the energy of the overall system.

TABLE 1

Simulated System Parameters
Simulation Parameters

|  | 10 Mhz | Ba | Filter | Traditional | Filter | Near Thres |
|---|---|---|---|---|---|---|
| Core Voltage | 450 mV | 1.2 V | 450 mV | 1.2 V | 450 mV | 1.2 V |
| Filter Cache Voltage | N/A |  | 800 mV | 1.2 V | 500 mV | 1.2 V |
| Filter Cache Size | N/A |  | 1 kB |  | 512 B |  |
| 1.1 Cache Voltage | 800 mV | 1.2 V | 800 mV | 1.2 V | 800 mV | 11.2 V |
| L1 Cache Size | 8 kB |  | 7 kB |  | 7 kB |  |
| L1 Cache Ways | 8 |  | 7 |  | 7 |  |

For the simulation, MiBench benchmarks [7] were used. These benchmarks are small embedded system benchmarks and represent a range of applications, from automotive to encryption. The benchmarks were run to completion for all test cases using the reduced input sets. Further analysis was done using the Specint 2000 benchmarks [8]. This analysis shows similar results as the MiBench studies and is briefly presented at the end of the results section below.

Accurate energy consumption models were created for the system using SPICE simulation tool analysis coupled with iso-robustness analysis. All of CPU, cache, bus, level converter, and off-chip access energy were accounted for in the analysis. All data presented is using a commercial 130 nm process, some additional analysis was done to verify that the trends still hold in both 90 nm and 65 nm.

For the cache model of the simulations, the iso-robustness analysis method discussed above was used, assuming that standard SRAM cells can operate reliably down to 800 mV, to determine the appropriate cell size to meet the delay of the core and iso-robustness reliability constraint for any near threshold SRAM cells. SPICE modeling was then used on the SRAM cell to determine the dynamic and leakage energy consumption of the cell at different operating points. The energy in the data and tag arrays of the cache, but not the cache controller was accounted for. This may result in the simulation energy figures being slightly lower than a real system. The use of body-bias techniques is assumed in our experiments to reduce the cache leakage energy.

The CPU model, was based on the core energy consumption numbers from a cacheless 400 MHz ARM9 core. SPICE simulation of some representative smaller CMOS circuitry was used in order to determine the impact of voltage and frequency scaling on the core for both dynamic and leakage energy. The off chip latency was derived for a memory system composed of SRAM for data, and ROM (Read Only Memory) for instructions. This is a typical setup for an embedded system, and the latency was 20 cycles at 400 MHz. The energy consumed in the package and a reasonable amount of off-chip routing was accounted for in all the measurements. However, the energy of the off-chip memory itself was not accounted for in the simulation.

The simulation results will now be discussed.

The first analysis to be performed was on the simple near threshold filter cache. The first step was to determine the L1 size for the baseline system without a filter cache that provided the lowest energy solution. A sweep of 1,1 sizes and associativities yielded an optimal size of an 8 kB, 8-way cache for the MiBench benchmarks. Then, while holding the die size constant the lowest energy system with a near threshold filter cache size was determined. The analysis was done keeping in mind that the size of the near threshold filter cache SRAM cells would be larger in size than the standard ones used in the L1 cache. Across the benchmarks the optimal (or at least most favourable) size was a filter cache of either 512 B or 1 kB. For our studies we chose a 512 B filter cache and a 7 kB, 7-way L1 cache. For comparison a filter cache designed with standard SRAM cells, which do no support voltage scaling below 800 mV was evaluated. This configuration is denoted a traditional filter cache. In that case, the configuration of a 1 kB filter cache and a 7 kB, 7-way L1 cache was chosen. A larger filter cache is possible in this case because the SRAM cells do not have to be sized to operate at lower supply voltages. A summary of the baseline and filter cache systems can be found in Table 1. For the initial results we do not use the bypass method of the embodiment of FIG. 4B, the impact of using a bypass on the filter cache will be evaluated below.

Figure 9:
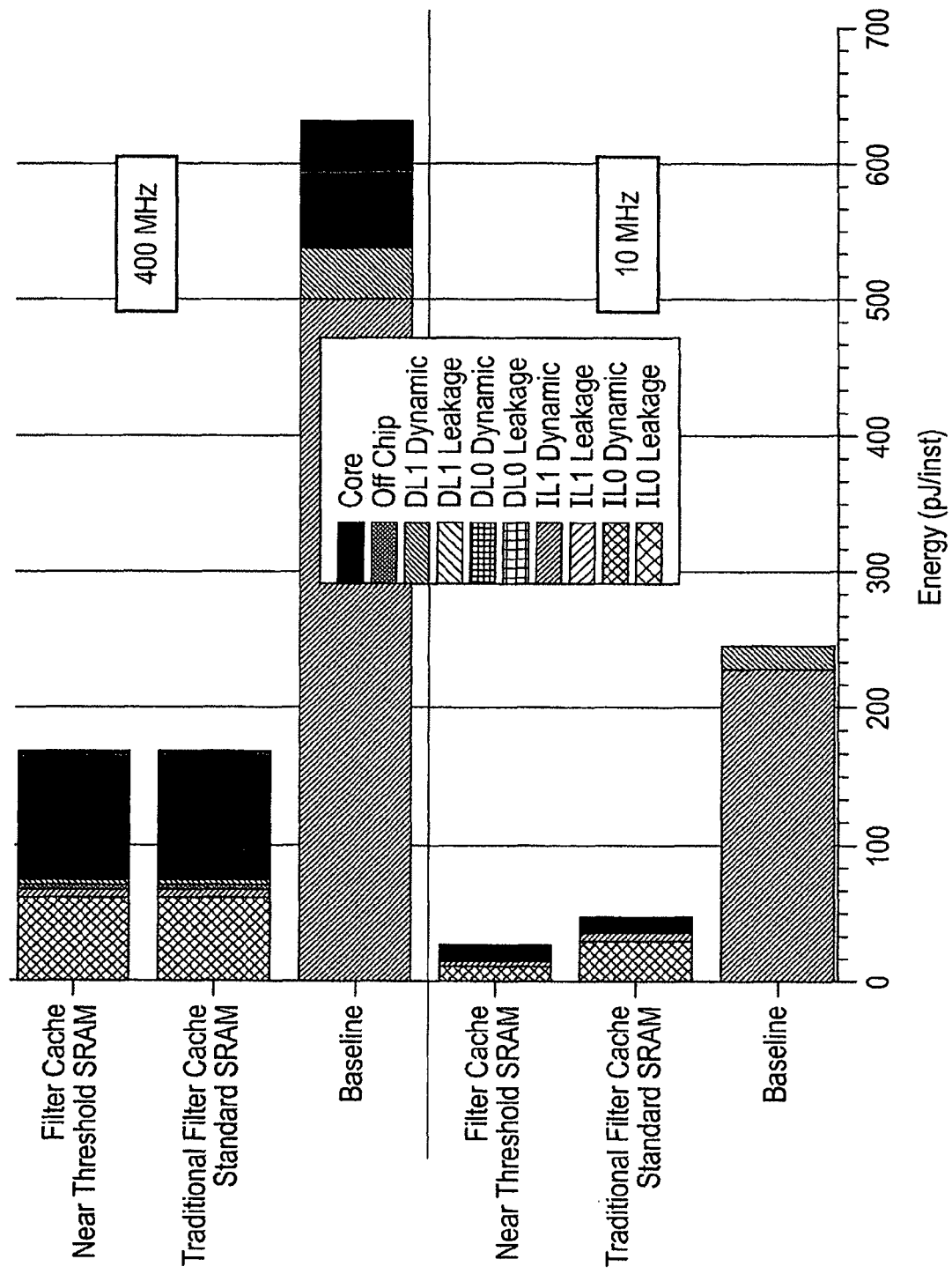
FIG. 9 schematically illustrates test analysis results for an embodiment of the filter cache arrangement of FIG. 4A.

The results of the analysis for a filter cache without bypass are presented in FIG. 9. Results comparing a previously known traditional filter cache are shown alongside filter caches having near-threshold SRAM according to embodiments of the present invention. FIG. 9 schematically illustrates test analysis results for an embodiment of the filter cache arrangement of FIG. 4A. In FIG. 9 there are 6 bars, the first 3 bars are for the system at 400 MHz and the second 3 are for the system at 10 MHz. The bars present the total energy of the system divided by the number of instructions completed. The analysis is illustrated with a the BitCount benchmark. The first thing to note is that by simply using voltage scaling on the baseline system we can reduce the energy consumption to complete this benchmark by 60% (3rd bar vs. 6th bar). It can also be seen that, because the core can be more aggressively voltage scaled, the cache quickly becomes the dominant energy source at low frequencies. From FIG. 9, it can be seen that the IL1 (instruction level 1 cache) consumes most of the energy in the memory system for BitCount. Using a filter cache dramatically reduces this IL1 dynamic energy by shielding the HA with a small filter cache. This results in a 73% (2nd and 3rd bars) reduction in energy at 400M and a 82% reduction in energy at 10 MHz (5th and 6th bars) over their equivalent speed baseline counterparts.

Figure 10:
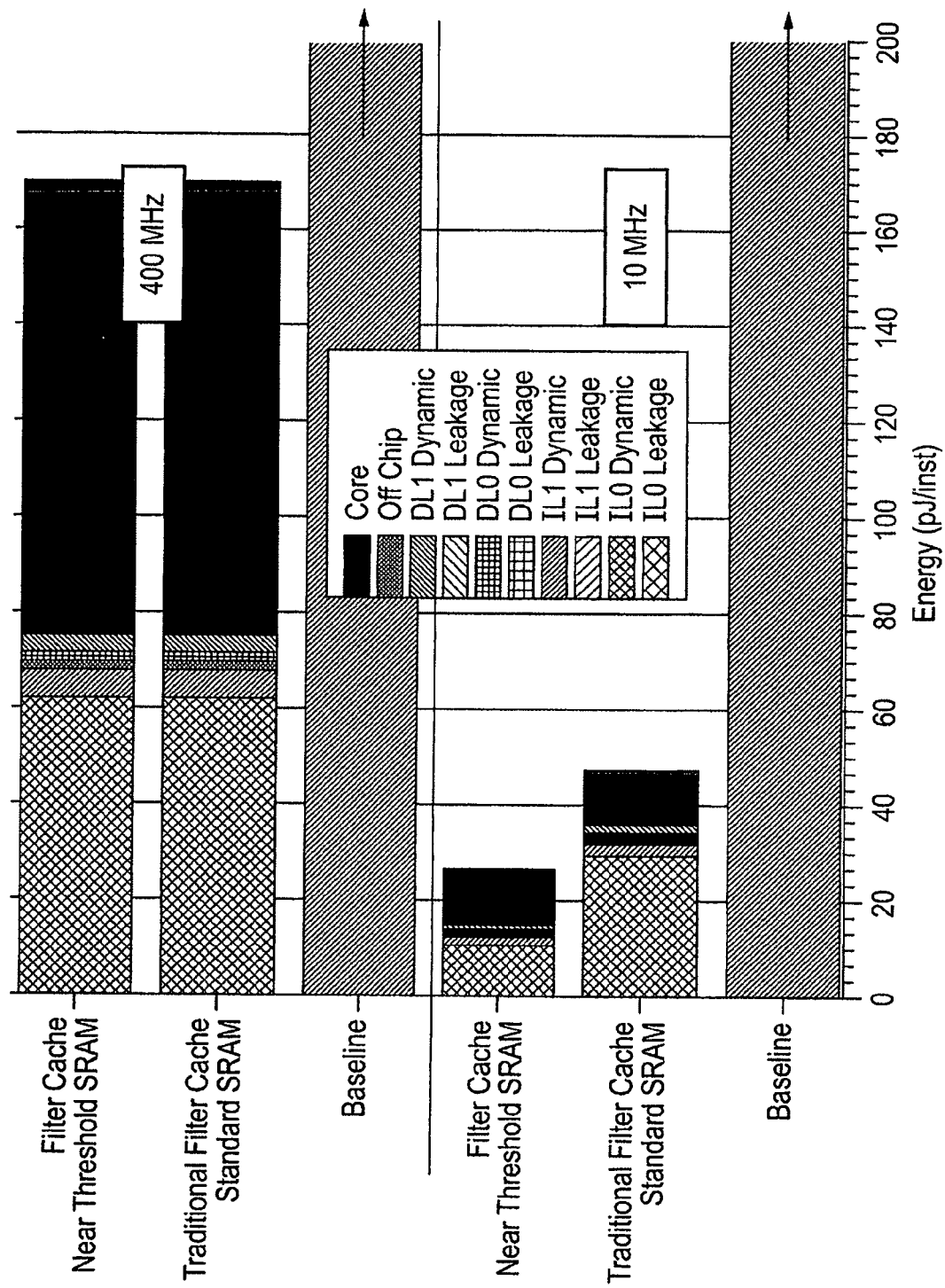
FIG. 10 is a bar chart responding to a zoomed in version of the bar chart of FIG. 9 and corresponds to the filter cache arrangement of FIG. 4A.

FIG. 10 presents a zoomed in portion of FIG. 9 to help better see the shorter bars. The addition of near threshold supply voltage scaling capabilities on the filter cache does two things. First, it reduces the energy consumption at 10 MHz a further 45% over the traditional filter cache. Second, due to the larger cell sizes, the energy at 400 MHz is increased by around 1%. This increase is mitigated by the fact that although the near threshold filter cache has larger cell sizes, there are only half as many cells as the traditional filter cache (see Table 1).

Figure 11:
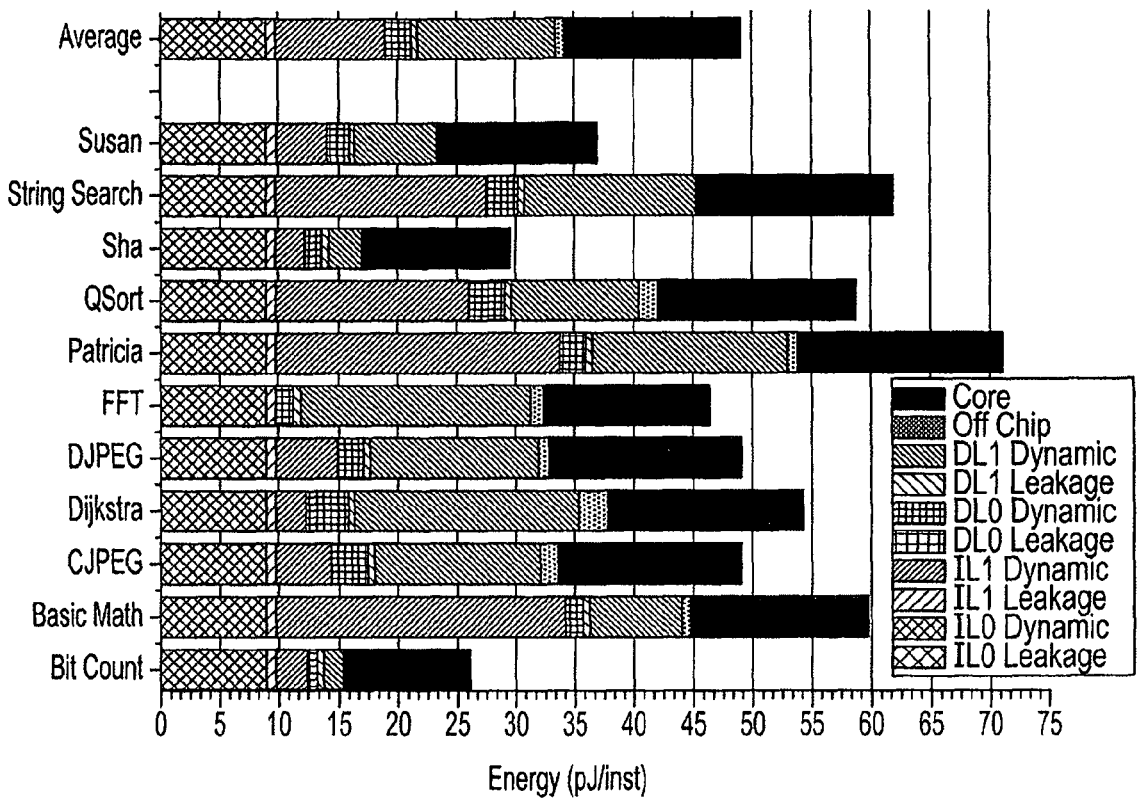
FIG. 11 is a bar chart showing energy breakdowns for a number of benchmarks at 10 MHz for the filter cache of FIG. 4A.
Figure 12:
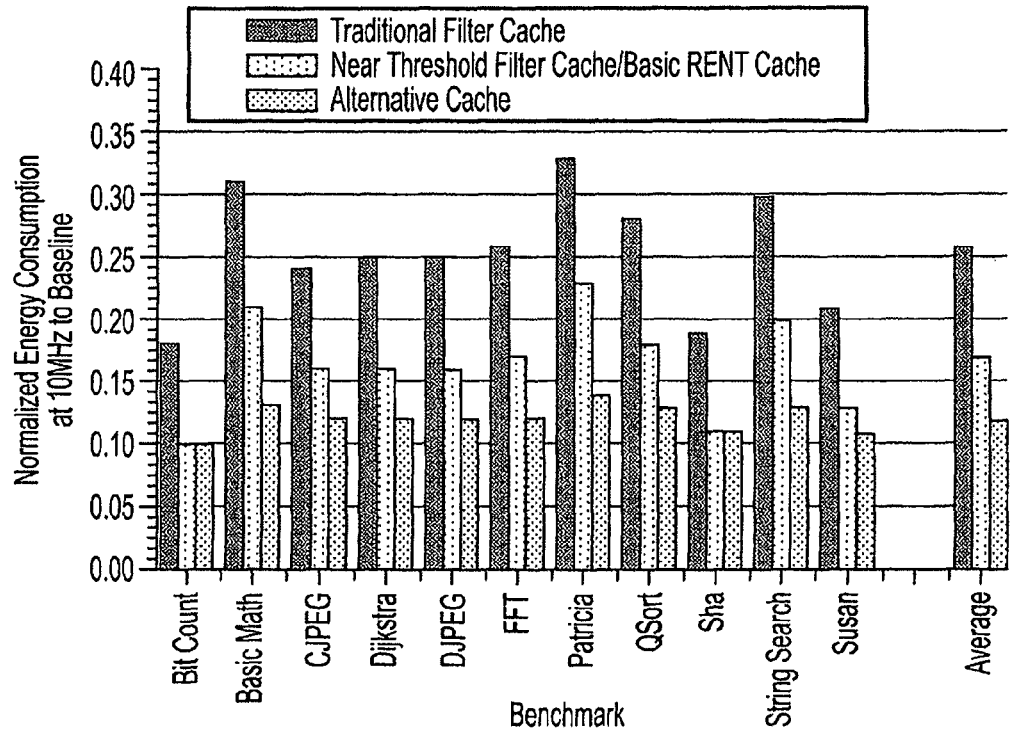
FIG. 12 is a bar chart that provides cache energy comparisons for all benchmarks normalised at the base line at 10 MHz for the filter cache arrangement of FIG. 4A.

FIG. 11 shows additional benchmarks from the MiBench suite and the performance of the near threshold filter cache. FIG. 12 shows how the near threshold filter cache's energy consumption compares to the traditional filter cache and the baseline at 10 MHz. On average the near threshold voltage scaled filter cache shows an 84% reduction in energy over the baseline at 10 MHz, and a 36% reduction over a traditional filter cache.

Figure 13:
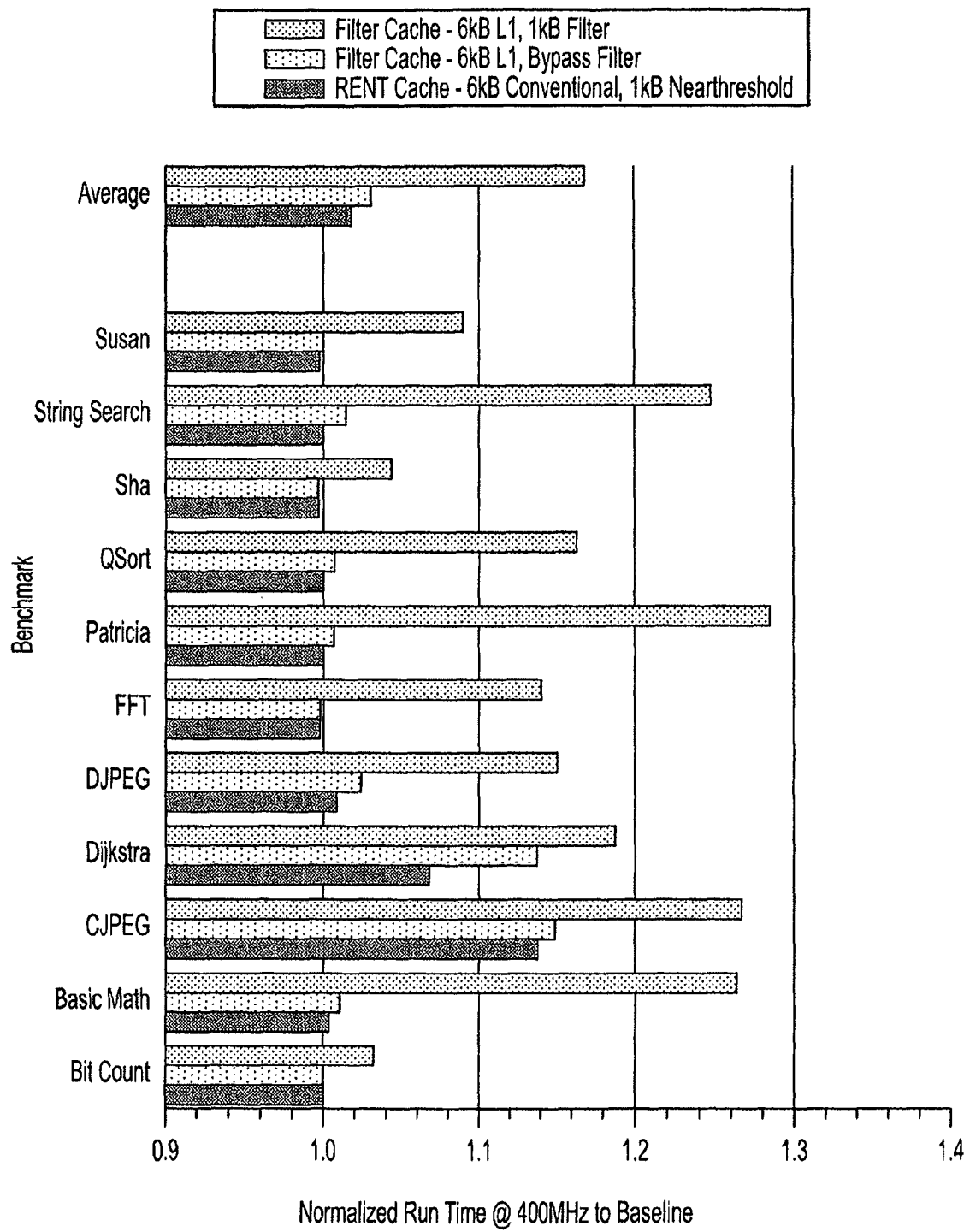
FIG. 13 is a bar chart that schematically illustrates normalised run times at full voltage corresponding to analysis results for different benchmarks for each of: the filter cache of FIG. 4A; the filter cache having the bypass network of FIG. 4B; and the cache of FIG. 6 having both a standard mode and a power-saving mode of operation.

Now consider employing a filter cache with bypass as in the embodiment of FIG. 4B. The filter cache of FIG. 4A (without bypass) does present some drawbacks. As mentioned above, the existence of the filter cache can degrade performance when the miss rate in the filter cache is high. FIG. 13 presents the increase in runtime that occurs over the baseline system when a filter cache is used. Note that for this analysis a filter cache size of 1 kB and a 6 kB, 6-way 1,1 was used so that equal die size RENT caches could be compared. On average a 17% increase in runtime occurs with a standard deviation of 9%. The worst case was a 29% increase in runtime for the Patricia benchmark. In order to reduce the runtime increase a bypass network can be employed which is enabled when the miss rate is high. The operation of the bypass filter cache is described above with reference to FIG. 4B. FIG. 13 also shows the resultant runtime when the bypass network is used. Notice that now the average runtime increase is only 3.3% with a 5.6% standard deviation. The benchmarks that still have a significant increase in runtime happen as a result of having a working set that is larger than the 1,1 cache. This leads to additional off-chip accesses which are long latency. Those benchmarks would benefit from being able to utilize the cache space that is being disabled by the bypass network.

Now consider simulation results for the RENT cache of the FIG. 5 and FIG. 6 embodiments. Using the RENT cache the cache capacity on chip can be increased when running in the conventional mode. The simulation configuration is slightly different because all ways in the cache should be the same size. The resultant cache sizes are presented in Table 2, notice that the near threshold tolerant cache way requires about the same space as two conventional cache ways and the total cache size is decreased. This is better than the bypass cache because it allows the benchmark to utilize more of the cache on chip in conventional mode, 7 kB. In addition the cache is also able to adapt dynamically to different phases of program behaviour. The third bar in FIG. 13 shows that with the use of the RENT cache the runtime overhead can be reduced even further. The average increase is now just 2.1% on average with a 4.4% standard deviation. The use of the RENT cache has also kept the energy consumption at the same level in the low power mode as the bypass filter cache of FIG. 4B.

TABLE 2

Simulated System Parameters for RENT Cache

| | Baseline | RENT Cache |
|---|---|---|
| # of Near Threshold Cache 1 kB | 0 | 1 |
| # of Conventional Cache 1 kB Ways | 8 | 6 |

Figure 14:
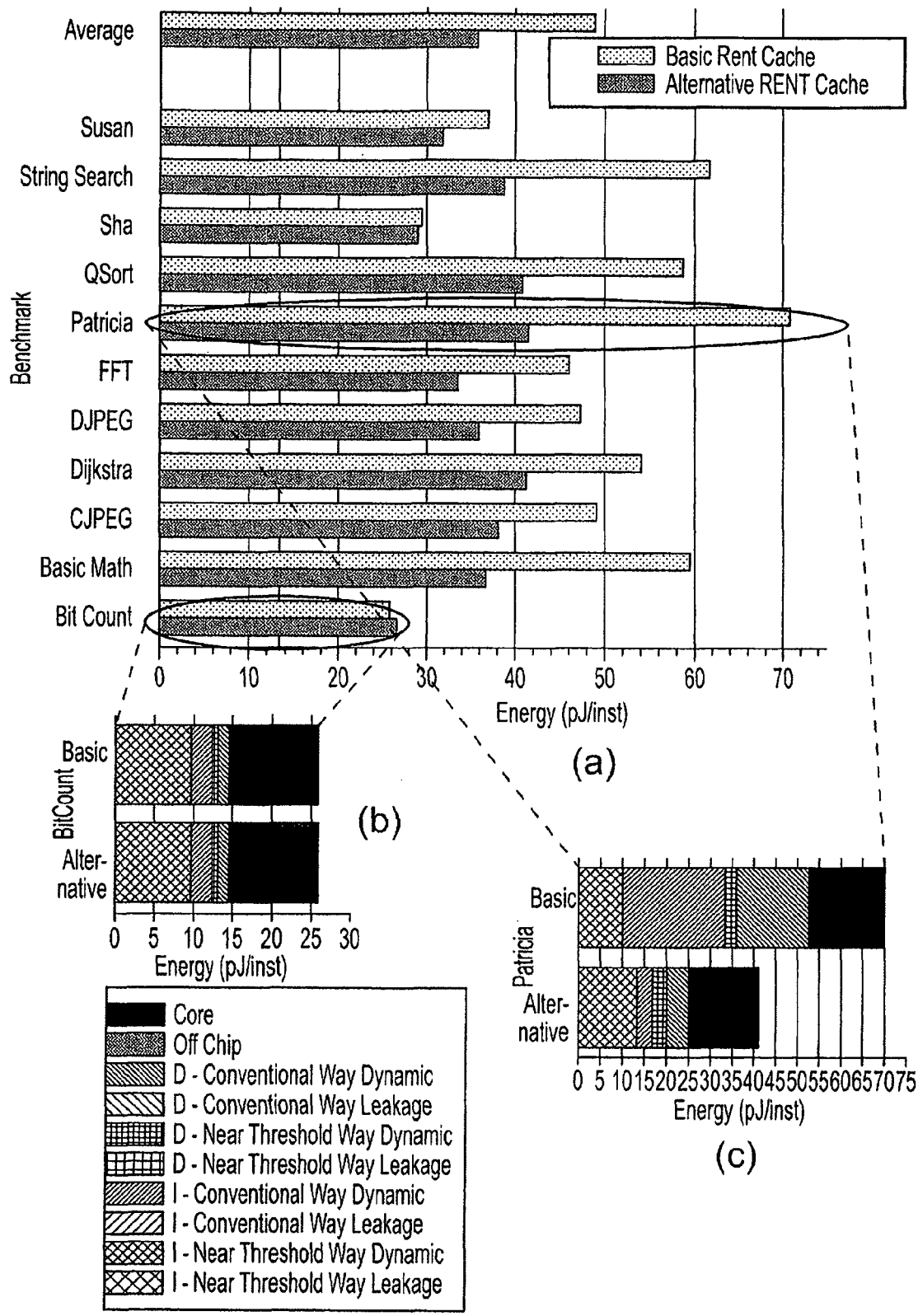
FIG. 14 is a bar chart that shows analysis results that compare an implementation of the cache arrangement of FIG. 6, in which only a subset of the tag arrays are accessed initially, with the cache arrangement of FIG. 8, where all of the tag arrays are accessed in parallel in an initial cycle.

Using the alternative RENT cache of the FIG. 8 embodiment, the energy savings can be even greater. The die size is slightly larger to accommodate the near threshold tags, but was not significant enough to justify the removal of another full data cache way. In FIG. 14(a) the basic and alternative version of the RENT cache are compared across the MiBench benchmarks. For almost all the cases, there is a decrease in total energy. A blown-up detailed view of the Patricia benchmark is presented in FIG. 14(c). It clearly shows a reduction in the energy of the conventional ways of the cache. The dynamic energy to the near threshold portion of the cache is increased due to the additional tag checks being done. In this case the decrease in the conventional access energy outweighed the increase in the tags an the alternative method was better. In FIG. 14(b) a case is presented in which the basic RENT cache (of FIGS. 5 and 6) outperforms the alternative version (of FIG. 8), the BitCount benchmark. In this case there was already very little conventional way dynamic energy and the increase in the filter way dynamic energy from the additional tag accesses was too large for the alternative method to be more energy efficient. Note that in all cases there is a slight reduction in runtime and therefore a small reduction in the leakage energy for all the alternative RENT cache methods. This reduction in runtime comes from being able to issue off-chip requests after the first cycle instead of the second cycle, thus reducing the total runtime by one cycle per off-chip access. It is hard to see this decrease in the graph, but the data confirms this expected result. From FIG. 12, on average the alternative RENT cache policy provides an additional 27% average energy reduction over the basic RENT cache, 54% over the traditional filter cache, and an 88% over the baseline at 10 MHz.

Figure 15:
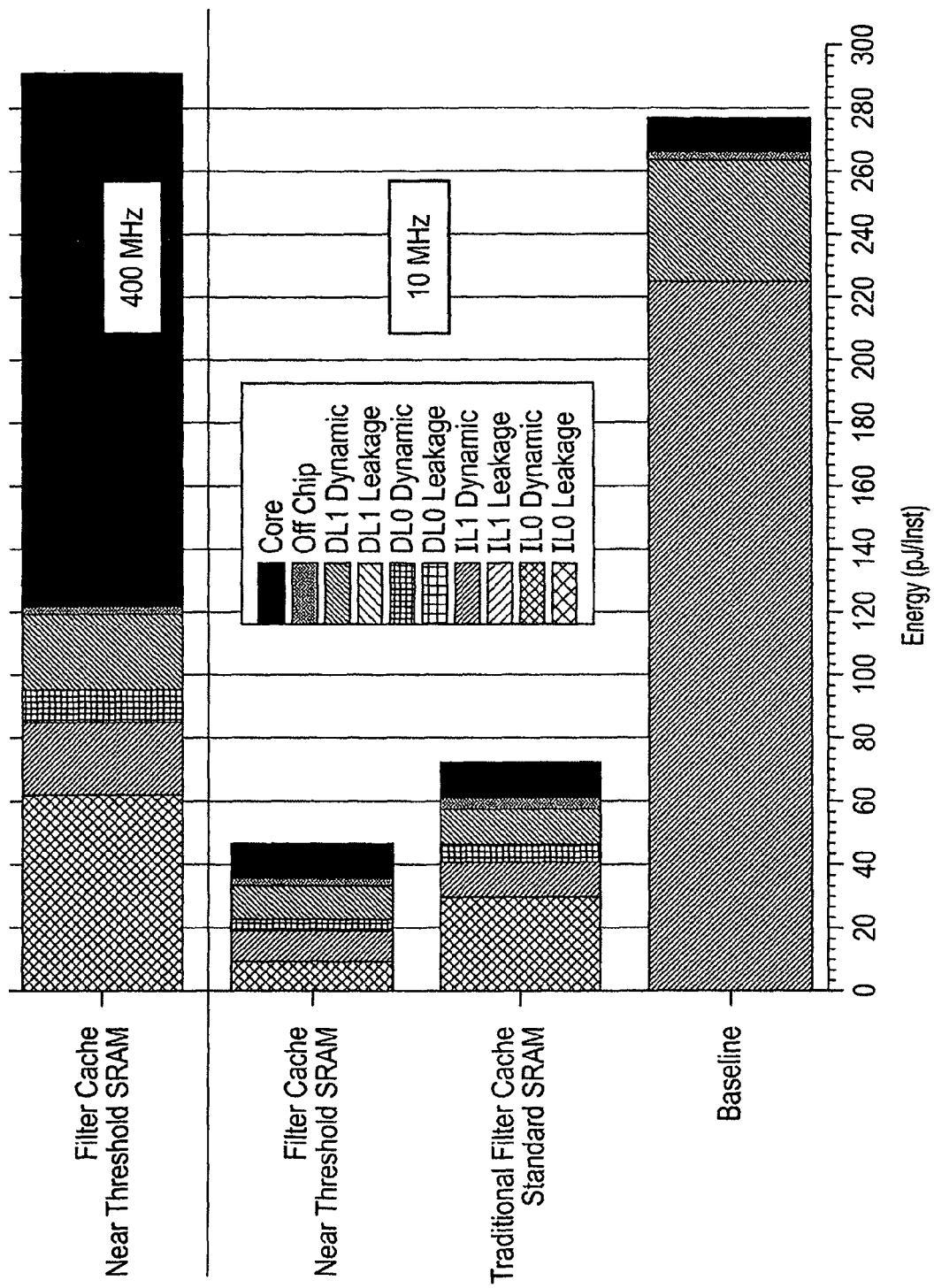
FIG. 15 is a bar chart that schematically illustrates analysis results comparing a known traditional filter cache in which all of the memory cells are substantially identical with each of the filter cache of FIG. 4A and the filter cache of FIG. 4B.
Figure 16:
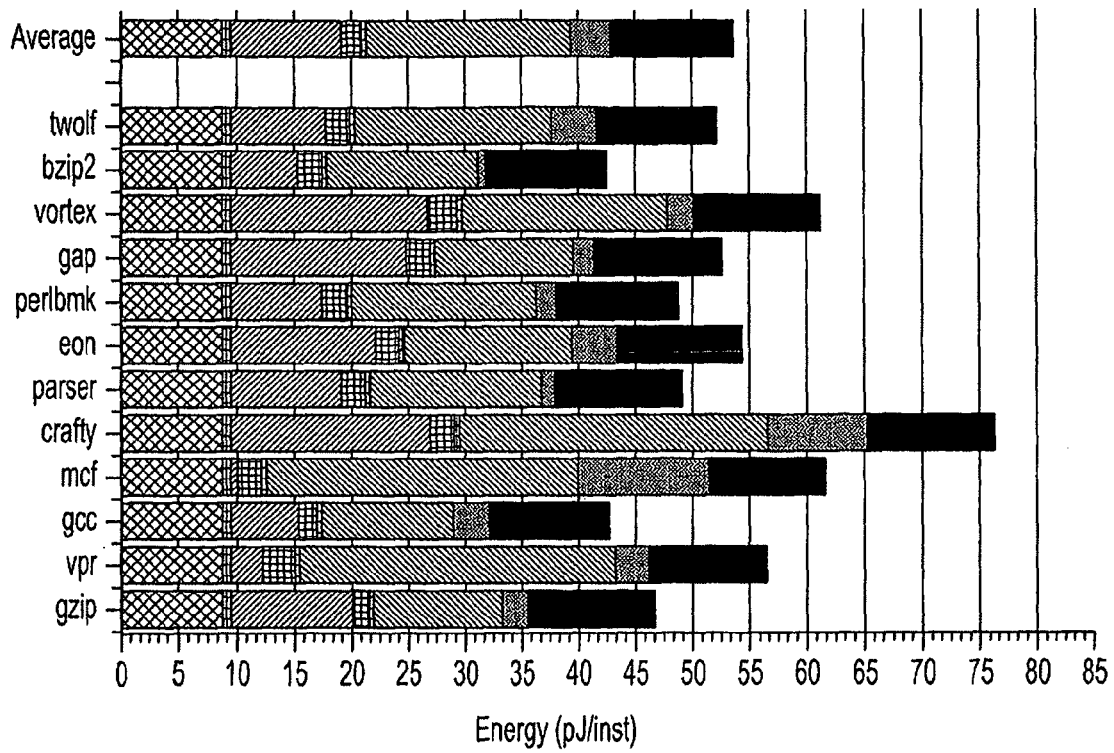
FIG. 16 is a bar chart showing the energy consumed per instruction for a plurality of different benchmarks for the cache configuration of FIG. 6.
Figure 17:
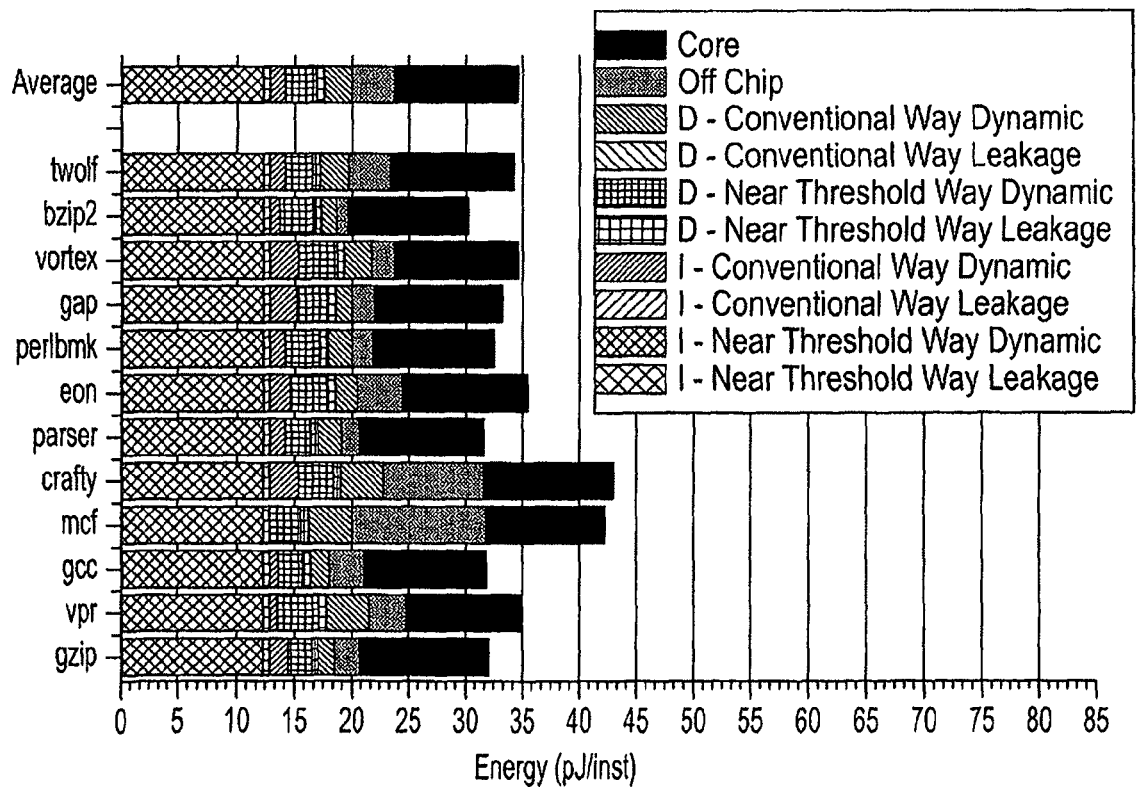
FIG. 17 is a bar chart that schematically illustrates the energy breakdown for a plurality of different benchmarks for the cache configuration of FIG. 8.

Analysis was also done using SPECINT benchmarks. FIG. 15 shows the energy breakdown of the GZIP benchmark for the traditional and near threshold filter caches. Notice that even for these larger benchmarks we are still seeing a 34% reduction in energy using the near threshold SRAM cells. FIG. 16 and FIG. 17 show the energy breakdowns of the 10 MHz basic and alternative RENT caches. We still show significant energy reductions using the alternative policy for the Specint benchmarks. Overall a 57% reduction on average is seen using the alternative RENT cache (of FIG. 8) over a traditional filter cache (of FIGS. 5 and 6) at 10 MHz.

Power savings figures (for cache power-saving mode) were calculated by taking the energy consumption of the alternative rent cache in the low power mode, 10 MHz, and comparing that to the high performance mode, 400 MHz. For the MiBench benchmarks on average we show an 86% (7.3×) reduction in energy when operating in low power mode, with only a 2% increase in runtime in high performance mode. For the SpecInt benchmarks we show on average a 77% (4.4×) reduction in energy in low power mode with only an average 4.8% increase in runtime while in the high performance mode.

A number of additional experiments were run, but for brevity the results are not presented here. These experiments included sensitivity analysis for the off-chip latency and energy consumption numbers. Eventually, if the off-chip energy becomes very large, focusing on the core and cache is less important. Such systems will likely require a corresponding research effort to reduce main memory power. Additional analysis also included threshold voltage techniques to decrease leakage energy as well as drowsy cache techniques [10]. Analysis was also done for a 1 MHz low power target, where the core was scaled to 300 mV, but in that case the leakage energy of the caches began to dominate and only provided marginal savings over the 10 MHz system. This was the sub-threshold region mentioned in Section 1.

There has been a significant amount of work done in the area of energy efficient cache architectures, particularly for embedded applications. The present technique differs from the previously known work at least because a near threshold tolerant SRAM design is used to explore cache architectures that can scale into the near threshold operating region. This can result in significant energy savings of 36% over a traditional filter cache. The original work on filter caches was presented by Kin et al. [12] and Tang et al. [14] expanded on that work by creating a prediction network that would allow the instruction filter cache to be bypassed.

Further work in the reduction of cache energy was done by Albonesi [1]. That work proposed a cache that reconfigures itself to be optimal in size. This is achieved by enabling and disabling ways of the cache. This work is orthogonal to the present technique and the above described embodiments but could be used to further improve energy performance by disabling cache ways for applications with small working sets. Inoue et al. investigated the idea of way prediction [9] and Powell et al. [13] expanded on it. In their work only the predicted way is accessed on the first cycle, after which the other ways are accessed. This is similar to the RENT cache of embodiments of the present invention in that only accessing one way of the cache is accessed on the first processing cycle. However, the above described embodiments differ from known way prediction mechanisms the near threshold tolerant way of the cache is started with and the MRU block is swapped into that way of the cache. This helps to leverage the low energy of accessing this way of the cache. And lastly, Zheng [22] proposes a cache that uses way concatenation to help reconfigure the cache into the optimal energy configuration.

There has also been a large number of studies on sub-threshold systems [19, 21, 16, 6]. These studies, however, focus on small performance targets or chip multiprocessing, unlike embodiments of the present invention which target a single general purpose core that can operate in both low power mode and high performance mode. There has also been substantial work on sub-threshold and near threshold SRAM design [18, 4, 15, 11], but none of these considers potential cache architectures for embedded applications, or properly address yield and robustness constraints.

In conclusion, embedded processors, particularly for mobile applications, are requiring more demanding performance but still have battery lifetime as a critical design parameter. Embodiments of the present invention provide an embedded processor with a high performance mode to handle time sensitive and compute intensive work, and a low power mode which can complete non-critical tasks in an energy efficient manner. To achieve this investigate near threshold tolerant memory structures are employed coupled with voltage and frequency scaling.

The RENT caches of the FIGS. 5, 6 and 8 embodiments provide both a reduction in energy in low power mode and a minimal (or at least reduced) increase in runtime in high performance mode. The cache is designed with one near threshold voltage tolerant cache way to filter accesses to the rest of the cache. In a power-saving mode this cache way is accessed first, and only on a miss are the other cache ways accessed. If the miss rate in the near threshold cache way becomes to large and degrades performance the cache is dynamically reconfigured to act like a conventional cache, where all the cache ways are accessed in parallel. This changes the cache to have a uniform, single cycle hit latency. Using this technique, a 53% reduction in energy over a traditional filter cache can be shown. This leads to a system that provides a 86% (7.3×) reduction in energy while in low power mode with only a 2% increase in runtime in high performance mode.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

REFERENCES

[1] D. Alboriesi. Selective cache ways: On-demand cache resource allocation. 1999.

[2] N. Binkert, R. G. Dreslinski, L, R. Hsu, K. T. Lim, A. G. Saidi, and S. K. Reinhardt. The M5 simulator: Modeling networked systems. IEEE Micro, 26(4):52-60, July/August 2006.

[3] B. Calhoun and A. Chandrakasan. Characterizing and modeling minimum energy operation for sub-threshold circuits. In IEEE/ACM ISLPED, 2004.

[4] B. Calhoun and A. Chandrakasan. A 256 kb sub-threshold sram in 65 nm cmos. In IEEE ISSCC, 2006.

[5] G. Chen, D. Blaauw, N. S. Kim, T. Mudge, and D. Sylvester. Yield-driven near-threshold sram design. In Proc. 2007 Int'l Conf on Computer Aided Design, 2007.

[6] R. G. Dreslinski, B. Zhai, T. Mudge, D. Blaauw, and D. Sylvester. An energy efficient parallel architecture using near threshold operation. In Proc. 16th Ann. Int'l Conf. on Parallel Architectures and Compilation Techniques, 2007,

[7] M. R. Guthaus, J. S. Ringenberg, T. M. Austin, T. Mudge, and Ft B. Brown. Mibench: A free, commercially representative embedded benchmark suite. In 4th Annual Workshop on Workload Characterization, December, 2001.

[8] J. L. Henning. SPEC CPLI2000: Measuring CPU performance in the new millennium. IEEE Computer, 33(7):28-35, July 2000.

[9] K. Inoue, T. Ishihara, and K. Murakari. Way-predicting set-associative cache for high performance and low energy consumption, In Proc. 1999 Int'l Symp. on Low-Power Electronics and Design, 1999.

[10] N. S. Kim, K. Flautner, and et al. Single-vdd and single-vt super-drowsy techniques for low-leakage high-performance instruction caches. In IEEE/ACM ISLPED, 2004.

[11] T.-H. Kim, J. Liu, and et al. A high-density sub-threshold sram with data-independent bitline leakage and virtual-ground replica scheme. In IEEE ISSCC, 2007.

[12] Kin and M. Gupta. The filter cache: An energy efficient memory structure. 1997.

[13] M. Powell, A. Agarwal, T. N. V. Kumar, and B. Faldafi. Reducing set-associative cache energy via way-prediciction and selective direct mapping. In 34th Ann. Symp. on Microarchitecture, 2002.

[14] W. Tang, R. Gupta, and A, Nicolau. Design of a predictive filter cache for energy savings in high performance processor architectures, 2001.

[15] Verma and A, Chandrakasan. A 65 nm 8t sub-vt sram employing sense-amplifier redundancy. In IEEE ISSCC, 2007.

[16] A. Wang and A. Chandrakasan. A 180 mv fit processor using sub-threshold circuits techniques, 2004.

[17] B. Zhai, D. Blaauw, and et al. Theoretical and practical limits of dynamic voltage scaling. In DAC, 2004.

[18] B. Zhai, D. Blaauw, and et. al. A sub-200 mv 61, sram in 0.13 um cmos. In IEEE ISSCC, 2007.

[19] B. Zhai, R. G. Dreslinski, D. Blaauw, T. Mudge, and D. Sylvester. Energy efficient near threshold chip multiprocessing. In Proc. 2007 Int'l Symp. on Low-Power Electronics and Design, 2007.

[20] B. Zhai, S. Hanson, D. Blaauw, and D. Sylvester. Analysis and mitigation of variability in sub-threshold design. In Proc. 2005 Intl Symp. on Low-Power Electronics and Design, 2005,

[21] B. That, L, Nazhandali, J. Olson, A. Reeves, M. Minuth, R. Helfand, S. Pant, D. Blaauw, and T. Austin. A 2.60 pj/inst sub-threshold sensor processor for optimal energy efficiency. IEEE VLSI Technology and Circuits, 2006.

[22] C. Meng, F. Vahid, and W. Najar. A highly configurable cache architecture for embedded systems. In Proc. 30th Ann. Intl Symp. on Computer Architecture, 2003.

We claim:

1. Apparatus for processing data comprising:
a cache memory comprising a plurality of memory cells forming a storage array having a plurality of cache lines and a tag array providing an index of memory locations associated with data elements currently stored in said storage array;
a cache controller coupled to said cache memory and responsive to a cache access request from processing circuitry to perform a cache lookup with reference to said tag array;
wherein said plurality of memory cells comprises a first memory cell group configured to operate in a first voltage domain and a second memory cell group configured to operate in a second voltage domain different from said first voltage domain, wherein said second voltage domain has a corresponding second operating voltage that is higher than a first operating voltage corresponding to said first voltage domain and at least a portion of said first memory cell group have a memory cell size that is larger than a memory cell size corresponding to said second memory cell group.

2. Apparatus as claimed in claim 1, wherein said cache memory is an N-way set associative cache having N storage arrays and N tag arrays corresponding respectively to said N cache ways.

3. Apparatus as claimed in claim 2, wherein a first subset of said N storage arrays comprises said first memory cell group and a remaining subset of said N storage arrays comprises said second memory cell group.

4. Apparatus as claimed in claim 1, wherein said cache memory is responsive to a performance control signal indicative of a desired cache performance level to operate in a plurality of different cache modes.

5. Apparatus as claimed in claim 4, wherein said desired cache performance level is one of a standard performance level corresponding to a standard cache mode and a power-saving performance level corresponding to a power-saving cache mode in which less power is consumed relative to said standard cache mode.

6. Apparatus according to claim 5, wherein said cache controller is arranged to dynamically control said cache memory to operate in either said power-saving cache mode or said standard cache mode.

7. Apparatus as claimed in claim 5, wherein said cache memory is an N-way set associative cache having N storage arrays and N tag arrays corresponding respectively to said N cache ways and wherein a first subset of said N storage arrays comprises said first memory cell group and a remaining subset of said N storage arrays comprises said second memory cell group.

8. Apparatus as claimed in claim 7, wherein in said standard cache mode all of said N tag arrays and data from each of said corresponding N data arrays is accessed in parallel in a single processing cycle.

9. Apparatus according to claim 1, wherein one of a first operating voltage corresponding to said first voltage domain and a second operating voltage corresponding to said second voltage domain is substantially equal to a threshold voltage of the characteristic of a corresponding one of said first memory cell group or said second memory cell group.

10. Apparatus for processing data comprising:
a cache memory comprising a plurality of memory cells forming a storage array having a plurality of cache lines and a tag array providing an index of memory locations associated with data elements currently stored in said storage array;
a cache controller coupled to said cache memory and responsive to a cache access request from processing circuitry to perform a cache lookup with reference to said tag array;
wherein said plurality of memory cells comprises a first memory cell group configured to operate in a first voltage domain and a second memory cell group configured to operate in a second voltage domain different from said first voltage domain, wherein at least a portion of said first memory cell group have a different cell configuration than a memory cell configuration corresponding to said second memory cell group.

11. Apparatus as claimed in claim 10, wherein said cache memory is an N-way set associative cache having N storage arrays and N tag arrays corresponding respectively to said N cache ways.

12. Apparatus as claimed in claim 11, wherein a first subset of said N storage arrays comprises said first memory cell group and a remaining subset of said N storage arrays comprises said second memory cell group.

13. Apparatus as claimed in claim 10, wherein said cache memory is responsive to a performance control signal indicative of a desired cache performance level to operate in a plurality of different cache modes.

14. Apparatus as claimed in claim 13, wherein said desired cache performance level is one of a standard performance level corresponding to a standard cache mode and a power-saving performance level corresponding to a power-saving cache mode in which less power is consumed relative to said standard cache mode.

15. Apparatus according to claim 14, wherein said cache controller is arranged to dynamically control said cache memory to operate in either said power-saving cache mode or said standard cache mode.

16. Apparatus as claimed in claim 15, wherein said cache memory is an N-way set associative cache having N storage arrays and N tag arrays corresponding respectively to said N cache ways and wherein a first subset of said N storage arrays comprises said first memory cell group and a remaining subset of said N storage arrays comprises said second memory cell group.

17. Apparatus as claimed in claim 16, wherein in said standard cache mode all of said N tag arrays and data from each of said corresponding N data arrays is accessed in parallel in a single processing cycle.

18. Apparatus for processing data comprising:
a cache memory comprising a plurality of memory cells forming a storage array having a plurality of cache lines and a tag array providing an index of memory locations associated with data elements currently stored in said storage array;
a cache controller coupled to said cache memory and responsive to a cache access request from processing circuitry to perform a cache lookup with reference to said tag array;
wherein said plurality of memory cells comprises a first memory cell group configured to operate in a first voltage domain and a second memory cell group configured to operate in a second voltage domain different from said first voltage domain, wherein said cache memory is an N-way set associative cache having N storage arrays and N tag arrays corresponding respectively to said N cache ways, wherein a first subset of said N storage arrays comprises said first memory cell group and a remaining subset of said N storage arrays comprises said second memory cell group, wherein tag arrays corresponding to said first subset of said N storage arrays comprise said first memory cell group and tag arrays corresponding to said remaining subset of said N storage arrays comprise said second memory cell group.

19. Apparatus for processing data comprising:
a cache memory comprising a plurality of memory cells forming a storage array having a plurality of cache lines and a tag array providing an index of memory locations associated with data elements currently stored in said storage array;
a cache controller coupled to said cache memory and responsive to a cache access request from processing circuitry to perform a cache lookup with reference to said tag array;
wherein said plurality of memory cells comprises a first memory cell group configured to operate in a first voltage domain and a second memory cell group configured to operate in a second voltage domain different from said first voltage domain, wherein said cache memory is an N-way set associative cache having N storage arrays and N tag arrays corresponding respectively to said N cache ways, wherein a first subset of said N storage arrays comprises said first memory cell group and a remaining subset of said N storage arrays comprises said second memory cell group, wherein tag arrays corresponding to both said first subset of N storage arrays and said remaining subset of said N storage arrays comprise said first memory cell group.

20. Apparatus for processing data comprising:
a cache memory comprising a plurality of memory cells forming a storage array having a plurality of cache lines and a tag array providing an index of memory locations associated with data elements currently stored in said storage array;
a cache controller coupled to said cache memory and responsive to a cache access request from processing circuitry to perform a cache lookup with reference to said tag array;
wherein said plurality of memory cells comprises a first memory cell group configured to operate in a first voltage domain and a second memory cell group configured to operate in a second voltage domain different from said first voltage domain, wherein said cache memory is responsive to a performance control signal indicative of a desired cache performance level to operate in a plurality of different cache modes, wherein said desired cache performance level is one of a standard performance level corresponding to a standard cache mode and a power-saving performance level corresponding to a power-saving cache mode in which less power is consumed relative to said standard cache mode, wherein said cache is an N-way set associative cache having N storage arrays and N tag arrays corresponding respectively to said N cache ways and wherein a first subset of said N storage arrays comprises said first memory cell group and a remaining subset of said N storage arrays comprises said second memory cell group, wherein in said power-saving cache mode said first subset of N storage arrays is accessed in a given processing cycle and only in the event of a cache miss is said remaining subset of N storage arrays is accessed in a processing cycle subsequent to said given processing cycle.

21. Apparatus as claimed in claim 20, wherein tag arrays corresponding to both said first subset of N storage arrays and said remaining subset of said N storage arrays comprise said first group of memory cells and wherein a first operating voltage corresponding to said first voltage domain is lower than a second operating voltage corresponding to said second voltage domain and wherein all of said tag arrays are accessed in parallel in said given processing cycle.

22. Apparatus as claimed in claim 20, wherein tag arrays corresponding to said first subset of said N storage arrays comprise said first memory cell group and tag arrays corresponding to said remaining subset of said N storage arrays comprise said second memory cell group and wherein a first operating voltage corresponding to said first voltage domain is lower than a second operating voltage corresponding to said second voltage domain and wherein tag arrays corresponding to said first subset of said N storage arrays are accessed in said given processing cycle together with said first subset of N storage arrays whilst in the event of a cache miss in said first subset of N storage arrays, tag arrays corresponding to said remaining subset of said N storage arrays are accessed in a processing cycle subsequent to said given processing cycle and in parallel with access to said remaining subset of said N storage arrays.

23. Apparatus as claimed in claim 20 comprising a buffer, wherein in said power-saving cache mode, in the event of a cache miss corresponding to a cache access request when said first subset of N storage arrays is accessed, at least a portion of data from said first subset of N storage arrays is stored in said buffer.

24. Apparatus as claimed in claim 23, wherein in the event of a cache hit in said remaining subset of N storage arrays corresponding to said cache access request subsequently to said cache miss, data accessed as a result of said cache hit is stored in said first subset of N storage arrays in place of said data stored to said buffer.

25. Apparatus as claimed in claim 24, wherein said data stored in said buffer is stored in said remaining subset of N storage arrays in a processing cycle subsequent to a processing cycle corresponding to said cache hit in said remaining subset of N storage arrays.

26. Apparatus as claimed in claim 24 comprising monitoring circuitry for monitoring a hit rate for cache access requests in said first subset of N storage arrays.

27. Apparatus as claimed in claim 26 comprising mode-control circuitry for dynamically controlling when said cache memory switches between said power-saving mode and said standard mode depending upon said hit rate.

28. Apparatus as claimed in claim 27, wherein said mode control circuitry causes said cache memory to switch from said power-saving mode to said standard mode when said hit rate is below a predetermined threshold.

29. Apparatus as claimed in claim 27, wherein said monitoring circuitry controls said dynamic switching between said power-saving mode and said standard mode depending upon information from a cache replacement policy algorithm.

30. Apparatus as claimed in claim 29, wherein said cache replacement policy is a Least Recently Used (LRU) policy.

31. Apparatus as claimed in claim 30, comprising monitoring circuitry for monitoring, when said cache memory is operating in said standard mode, a first count of cache hits occurring in a Most Recently Used cache block and a second count of cache hits occurring in a cache block other than said Most Recently Used cache Block.

32. Apparatus according to claim 31, comprising processing circuitry for calculating a miss rate corresponding to said first subset of N storage arrays using said first count and said second count.

33. Apparatus according to claim 32, wherein said mode control circuitry causes said cache memory to switch from said standard mode to said power-saving mode when said miss rate is below a predetermined threshold.

34. Apparatus for processing data arranged to operate at a plurality of different processing performance levels, said apparatus comprising:
  processing circuitry;
  a cache memory comprising a storage array having a plurality of cache lines and a tag array providing an index of memory locations associated with data elements currently stored in said cache memory, said cache memory comprising a first memory cell group configured to operate in a first voltage domain and a second memory cell group configured to operate in a second voltage domain different from said first voltage domain; and
  control circuitry for controlling said processing circuitry to operate at one of said plurality of different performance levels depending upon processing requirements and for controlling said cache memory to switch between a standard performance level corresponding to a standard cache mode and a power-saving performance level corresponding to a power-saving cache mode, in which less power is consumed relative to said standard cache mode, wherein said second voltage domain has a corresponding second operating voltage that is higher than a first operating voltage corresponding to said first voltage domain and at least a portion of said first memory cell group have a memory cell size that is larger than a memory cell size corresponding to said second memory cell group.

35. Method of caching data in a cache memory comprising a plurality of memory cells forming a storage array having a plurality of cache lines and a tag array providing an index of memory locations associated with data elements currently stored in said storage array and a cache controller coupled to said cache memory, said method comprising:
  performing, in response to a cache access request from processing circuitry, a cache lookup with reference to said cache tag array;
  configuring a first memory cell group of said plurality of memory cells to operate in a first voltage domain and configuring a second memory cell group of said plurality of memory cells to operate in a second voltage domain different from said first voltage domain, wherein said second voltage domain has a corresponding second operating voltage that is higher than a first operating voltage corresponding to said first voltage domain and at least a portion of said first memory cell group have a memory cell size that is larger than a memory cell size corresponding to said second memory cell group.

36. Apparatus for processing data comprising:
  means for caching data comprising a plurality of memory cells forming a means for storage having a plurality of cache lines and a means for storing tags providing an index of memory locations associated with data elements currently stored in said means for storage;
  means for controlling caching coupled to said means for caching data and responsive to a cache access request from means for processing to perform a cache lookup with reference to said means for storing tags;

wherein said plurality of memory cells comprises a first memory cell group configured to operate in a first voltage domain and a second memory cell group configured to operate in a second voltage domain different from said first voltage domain, wherein said second voltage domain has a corresponding second operating voltage that is higher than a first operating voltage corresponding to said first voltage domain and at least a portion of said first memory cell group have a memory cell size that is larger than a memory cell size corresponding to said second memory cell group.

37. Apparatus for processing data arranged to operate at a plurality of different processing performance levels, said apparatus comprising:

means for processing;

means for caching data comprising means for storage having a plurality of cache lines and a means for storing tags providing an index of memory locations associated with data elements currently stored in said means for caching data, said means for caching data comprising a first memory cell group configured to operate in a first voltage domain and a second memory cell group configured to operate at a second voltage domain different from said first voltage domain; and means for controlling said means for processing to operate at one of said plurality of different performance levels depending upon processing requirements and for controlling said means for caching data to switch between a standard performance level corresponding to a standard cache mode and a power-saving performance level corresponding to a power-saving cache mode, in which less power is consumed relative to said standard cache mode, wherein said second voltage domain has a corresponding second operating voltage that is higher than a first operating voltage corresponding to said first voltage domain and at least a portion of said first memory cell group have a memory cell size that is larger than a memory cell size corresponding to said second memory cell group.

38. Apparatus for processing data arranged to operate at a plurality of different processing performance levels, said apparatus comprising:

processing circuitry;

a cache memory comprising a storage array having a plurality of cache lines and a tag array providing an index of memory locations associated with data elements currently stored in said cache memory, said cache memory comprising a first memory cell group configured to operate in a first voltage domain and a second memory cell group configured to operate in a second voltage domain different from said first voltage domain; and control circuitry for controlling said processing circuitry to operate at one of said plurality of different performance levels depending upon processing requirements and for controlling said cache memory to switch between a standard performance level corresponding to a standard cache mode and a power-saving performance level corresponding to a power-saving cache mode, in which less power is consumed relative to said standard cache mode, wherein at least a portion of said first memory cell group have a different cell configuration than a memory cell configuration corresponding to said second memory cell group.

39. Method of caching data in a cache memory comprising a plurality of memory cells forming a storage array having a plurality of cache lines and a tag array providing an index of memory locations associated with data elements currently stored in said storage array and a cache controller coupled to said cache memory, said method comprising:

performing, in response to a cache access request from processing circuitry, a cache lookup with reference to said cache tag array;

configuring a first memory cell group of said plurality of memory cells to operate in a first voltage domain and configuring a second memory cell group of said plurality of memory cells to operate in a second voltage domain different from said first voltage domain, wherein at least a portion of said first memory cell group have a different cell configuration than a memory cell configuration corresponding to said second memory cell group.

40. Apparatus for processing data comprising:

means for caching data comprising a plurality of memory cells forming a means for storage having a plurality of cache lines and a means for storing tags providing an index of memory locations associated with data elements currently stored in said means for storage;

means for controlling caching coupled to said means for caching data and responsive to a cache access request from means for processing to perform a cache lookup with reference to said means for storing tags;

wherein said plurality of memory cells comprises a first memory cell group configured to operate in a first voltage domain and a second memory cell group configured to operate in a second voltage domain different from said first voltage domain, wherein at least a portion of said first memory cell group have a different cell configuration than a memory cell configuration corresponding to said second memory cell group.

41. Apparatus for processing data arranged to operate at a plurality of different processing performance levels, said apparatus comprising:

means for processing;

means for caching data comprising means for storage having a plurality of cache lines and a means for storing tags providing an index of memory locations associated with data elements currently stored in said means for caching data, said means for caching data comprising a first memory cell group configured to operate in a first voltage domain and a second memory cell group configured to operate at a second voltage domain different from said first voltage domain; and means for controlling said means for processing to operate at one of said plurality of different performance levels depending upon processing requirements and for controlling said means for caching data to switch between a standard performance level corresponding to a standard cache mode and a power-saving performance level corresponding to a power-saving cache mode, in which less power is consumed relative to said standard cache mode, wherein at least a portion of said first memory cell group have a different cell configuration than a memory cell configuration corresponding to said second memory cell group.

* * * * *